(12) United States Patent  
Kocienda et al.

(10) Patent No.: US 9,244,536 B2  
(45) Date of Patent: *Jan. 26, 2016

(54) METHOD, SYSTEM, AND GRAPHICAL USER INTERFACE FOR PROVIDING WORD RECOMMENDATIONS

(75) Inventors: Kenneth Kocienda, Sunnyvale, CA (US); Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1054 days.

This patent is subject to a terminal disclaimer.

(21) Appl. No.: 13/310,586

(22) Filed: Dec. 2, 2011

(65) Prior Publication Data

US 2012/0079412 A1 Mar. 29, 2012

Related U.S. Application Data

(63) Continuation of application No. 11/620,642, filed on Jan. 5, 2007, now Pat. No. 8,074,172.

(51) Int. Cl.
  *G06F 17/00* (2006.01)
  *G06F 3/023* (2006.01)
  *G06F 3/0488* (2013.01)

(52) U.S. Cl.
  CPC .......... *G06F 3/0237* (2013.01); *G06F 3/04883* (2013.01); *G06F 3/04886* (2013.01)

(58) Field of Classification Search
  CPC ........................... G06F 3/0237; G06F 3/04883
  USPC ......... 715/200, 230, 231, 255, 261, 263, 268, 715/271
  See application file for complete search history.

(56) References Cited

U.S. PATENT DOCUMENTS 5,038,401 A  8/1991  Inotsume
5,053,758 A  10/1991  Cornett et al.
(Continued)

FOREIGN PATENT DOCUMENTS

EP  0880090 A2  11/1998
EP  1271295 A2  1/2003
(Continued)

OTHER PUBLICATIONS

Office Action received for Taiwan Patent Application No. 097100079, mailed on Apr. 17, 2012, 34 pages (13 pages of English Translation and 21 pages of Official Copy).
(Continued)

*Primary Examiner* — Stephen Hong
*Assistant Examiner* — Gregory J Vaughn
(74) *Attorney, Agent, or Firm* — Morrison & Foerster LLP

(57) ABSTRACT

One aspect of the invention involves a method that includes: in a first area of the touch screen, displaying a current character string being input by a user with the keyboard; in a second area of the touch screen, displaying the current character string or a portion thereof and a suggested replacement for the current character string; replacing the current character string in the first area with the suggested replacement if the user activates a delimiter key on the keyboard; replacing the current character string in the first area with the suggested replacement if the user performs a first gesture on the suggested replacement displayed in the second area; and keeping the current character string in the first area if the user performs a second gesture on the current character string or the portion thereof displayed in the second area.

34 Claims, 14 Drawing Sheets

(56) References Cited

U.S. PATENT DOCUMENTS

| | | |
|---|---|---|
| 5,128,672 A | 7/1992 | Kaehler |
| 5,253,325 A | 10/1993 | Clark |
| 5,297,041 A | 3/1994 | Kushler et al. |
| 5,305,205 A | 4/1994 | Weber et al. |
| 5,565,894 A | 10/1996 | Bates et al. |
| 5,581,484 A | 12/1996 | Prince |
| 5,615,378 A | 3/1997 | Nishino et al. |
| 5,736,974 A | 4/1998 | Selker |
| 5,748,512 A | 5/1998 | Vargas |
| 5,748,927 A | 5/1998 | Stein et al. |
| 5,758,314 A | 5/1998 | McKenna |
| 5,765,168 A | 6/1998 | Burrows |
| 5,774,834 A | 6/1998 | Visser |
| 5,778,405 A | 7/1998 | Ogawa |
| 5,797,008 A | 8/1998 | Burrows |
| 5,801,941 A | 9/1998 | Bertram |
| 5,818,437 A | 10/1998 | Grover et al. |
| 5,818,451 A | 10/1998 | Bertram et al. |
| 5,896,321 A | 4/1999 | Miller et al. |
| 5,943,443 A | 8/1999 | Itonori et al. |
| 5,953,541 A | 9/1999 | King et al. |
| 5,956,021 A | 9/1999 | Kubota et al. |
| 5,963,671 A | 10/1999 | Comerford et al. |
| 5,999,895 A | 12/1999 | Forest |
| 6,023,536 A | 2/2000 | Visser |
| 6,040,824 A | 3/2000 | Maekawa et al. |
| 6,049,326 A | 4/2000 | Beyda et al. |
| 6,073,036 A | 6/2000 | Heikkinen et al. |
| 6,094,197 A | 7/2000 | Buxton et al. |
| 6,169,538 B1 | 1/2001 | Nowlan et al. |
| 6,212,412 B1 | 4/2001 | Rogers et al. |
| 6,259,436 B1 | 7/2001 | Moon et al. |
| 6,271,835 B1 | 8/2001 | Hoeksma |
| 6,292,179 B1 | 9/2001 | Lee |
| 6,295,052 B1 | 9/2001 | Kato et al. |
| 6,298,321 B1 | 10/2001 | Karlov et al. |
| 6,307,548 B1 | 10/2001 | Flinchem et al. |
| 6,323,846 B1 | 11/2001 | Westerman et al. |
| 6,359,572 B1 | 3/2002 | Vale |
| 6,424,338 B1 | 7/2002 | Anderson |
| 6,456,952 B1 | 9/2002 | Nathan |
| 6,469,722 B1 | 10/2002 | Kinoe et al. |
| 6,470,347 B1 | 10/2002 | Gillam |
| 6,570,557 B1 | 5/2003 | Westerman et al. |
| 6,573,844 B1 | 6/2003 | Venolia et al. |
| 6,597,345 B2 | 7/2003 | Hirshberg |
| 6,654,733 B1 | 11/2003 | Goodman et al. |
| 6,671,856 B1 | 12/2003 | Gillam |
| 6,675,169 B1 | 1/2004 | Bennett et al. |
| 6,677,932 B1 | 1/2004 | Westerman |
| 6,714,221 B1 | 3/2004 | Christie et al. |
| 6,760,580 B2 | 7/2004 | Robinson et al. |
| 6,795,059 B2 | 9/2004 | Endo |
| 6,803,905 B1 | 10/2004 | Capps et al. |
| 6,804,677 B2 | 10/2004 | Shadmon et al. |
| 6,857,800 B2 | 2/2005 | Zhang et al. |
| 6,926,609 B2 | 8/2005 | Martin |
| 6,938,220 B1 | 8/2005 | Shigematsu et al. |
| 7,038,659 B2 | 5/2006 | Rajkowski |
| 7,057,607 B2 | 6/2006 | Mayoraz et al. |
| 7,075,512 B1 | 7/2006 | Fabre et al. |
| 7,098,896 B2 | 8/2006 | Kushler et al. |
| 7,194,699 B2 | 3/2007 | Thomson et al. |
| 7,277,088 B2 | 10/2007 | Robinson et al. |
| 7,283,072 B1 | 10/2007 | Plachta et al. |
| 7,319,957 B2 | 1/2008 | Robinson et al. |
| 7,382,358 B2 | 6/2008 | Kushler et al. |
| 7,443,316 B2 | 10/2008 | Lim |
| 7,475,063 B2 | 1/2009 | Datta et al. |
| 7,477,240 B2 | 1/2009 | Yanagisawa |
| 7,490,034 B2 | 2/2009 | Finnigan et al. |
| 7,508,324 B2 | 3/2009 | Suraqui |
| 7,526,738 B2 | 4/2009 | Ording et al. |
| 7,565,380 B1 | 7/2009 | Venkatachary |
| 7,584,093 B2 | 9/2009 | Potter et al. |
| 7,609,179 B2 | 10/2009 | Diaz-Gutierrez et al. |
| 7,614,008 B2 | 11/2009 | Ording |
| 7,679,534 B2 | 3/2010 | Kay et al. |
| 7,683,886 B2 | 3/2010 | Willey |
| 7,694,231 B2 | 4/2010 | Kocienda et al. |
| 7,707,026 B2 | 4/2010 | Liu |
| 7,712,053 B2 | 5/2010 | Bradford et al. |
| 7,725,838 B2 | 5/2010 | Williams |
| 7,797,269 B2 | 9/2010 | Rieman et al. |
| 7,809,744 B2 | 10/2010 | Nevidomski et al. |
| 7,880,730 B2 | 2/2011 | Robinson et al. |
| 8,037,034 B2 | 10/2011 | Plachta et al. |
| 8,041,557 B2 | 10/2011 | Liu |
| 8,074,172 B2 | 12/2011 | Kocienda et al. |
| 8,090,571 B2 | 1/2012 | Elshishiny et al. |
| 8,370,737 B2 | 2/2013 | Zahavi et al. |
| 8,938,688 B2 | 1/2015 | Bradford et al. |
| 2002/0010726 A1 | 1/2002 | Rogson |
| 2002/0015024 A1 | 2/2002 | Westerman et al. |
| 2002/0015064 A1 | 2/2002 | Robotham et al. |
| 2002/0051018 A1 | 5/2002 | Yeh |
| 2002/0085037 A1 | 7/2002 | Leavitt et al. |
| 2002/0126097 A1 | 9/2002 | Savolainen |
| 2002/0135615 A1 | 9/2002 | Lang |
| 2002/0140679 A1 | 10/2002 | Wen |
| 2002/0140680 A1 | 10/2002 | Lu |
| 2002/0156615 A1 | 10/2002 | Takatsuka et al. |
| 2002/0167545 A1 | 11/2002 | Kang et al. |
| 2002/0191029 A1* | 12/2002 | Gillespie et al. .............. 345/810 |
| 2003/0063073 A1 | 4/2003 | Geaghan et al. |
| 2003/0090467 A1* | 5/2003 | Hohl et al. .................. 345/168 |
| 2003/0149978 A1* | 8/2003 | Plotnick ...................... 725/39 |
| 2003/0189553 A1 | 10/2003 | Goren |
| 2003/0193481 A1* | 10/2003 | Sokolsky .................... 345/173 |
| 2003/0197736 A1* | 10/2003 | Murphy ...................... 345/780 |
| 2003/0204392 A1 | 10/2003 | Finnigan et al. |
| 2004/0009788 A1 | 1/2004 | Mantyjarvi et al. |
| 2004/0070567 A1 | 4/2004 | Longe et al. |
| 2004/0135774 A1 | 7/2004 | La Monica |
| 2004/0140956 A1 | 7/2004 | Kushler et al. |
| 2004/0157586 A1 | 8/2004 | Robinson et al. |
| 2004/0160419 A1 | 8/2004 | Padgitt |
| 2004/0165924 A1 | 8/2004 | Griffin |
| 2004/0178994 A1 | 9/2004 | Kairls, Jr. |
| 2004/0183833 A1 | 9/2004 | Chua |
| 2004/0196256 A1* | 10/2004 | Wobbrock et al. ........... 345/156 |
| 2004/0218963 A1 | 11/2004 | Van Diepen et al. |
| 2005/0024341 A1* | 2/2005 | Gillespie et al. .............. 345/173 |
| 2005/0027622 A1 | 2/2005 | Walker et al. |
| 2005/0057498 A1 | 3/2005 | Gentle |
| 2005/0093826 A1 | 5/2005 | Huh |
| 2005/0099398 A1 | 5/2005 | Garside et al. |
| 2005/0116927 A1 | 6/2005 | Voelckers |
| 2005/0131687 A1 | 6/2005 | Sorrentino |
| 2005/0162395 A1 | 7/2005 | Unruh |
| 2005/0169527 A1 | 8/2005 | Longe et al. |
| 2005/0190970 A1 | 9/2005 | Griffin |
| 2005/0193351 A1 | 9/2005 | Huoviala |
| 2005/0216331 A1* | 9/2005 | Ahrens et al. ................. 705/11 |
| 2005/0246365 A1 | 11/2005 | Lowles et al. |
| 2005/0253816 A1 | 11/2005 | Himberg et al. |
| 2005/0253818 A1 | 11/2005 | Nettamo |
| 2005/0278647 A1 | 12/2005 | Leavitt et al. |
| 2005/0283364 A1 | 12/2005 | Longe et al. |
| 2005/0283726 A1 | 12/2005 | Lunati |
| 2006/0004744 A1 | 1/2006 | Nevidomski et al. |
| 2006/0007174 A1 | 1/2006 | Shen |
| 2006/0052885 A1 | 3/2006 | Kong |
| 2006/0053387 A1 | 3/2006 | Ording |
| 2006/0062461 A1 | 3/2006 | Longe et al. |
| 2006/0066590 A1 | 3/2006 | Ozawa et al. |
| 2006/0085757 A1 | 4/2006 | Andre et al. |
| 2006/0152496 A1* | 7/2006 | Knaven ...................... 345/172 |
| 2006/0161846 A1 | 7/2006 | Van Leeuwen |
| 2006/0181519 A1 | 8/2006 | Vernier et al. |
| 2006/0190256 A1 | 8/2006 | Stephanick et al. |
| 2006/0206454 A1 | 9/2006 | Forstall et al. |
| 2006/0246955 A1 | 11/2006 | Nirhamo et al. |
| 2006/0247915 A1 | 11/2006 | Bradford et al. |

(56) References Cited

U.S. PATENT DOCUMENTS

| | | | |
|---|---|---|---|
| 2006/0265208 A1 | 11/2006 | Assadollahi | |
| 2006/0265648 A1 | 11/2006 | Rainisto et al. | |
| 2006/0274051 A1 | 12/2006 | Longe et al. | |
| 2006/0288024 A1 | 12/2006 | Braica | |
| 2006/0293880 A1 | 12/2006 | Elshishiny et al. | |
| 2007/0040813 A1* | 2/2007 | Kushler et al. | 345/173 |
| 2007/0046641 A1 | 3/2007 | Lim | |
| 2007/0061754 A1 | 3/2007 | Ardhanari et al. | |
| 2007/0067272 A1 | 3/2007 | Flynt et al. | |
| 2007/0130128 A1 | 6/2007 | Garg et al. | |
| 2007/0152978 A1 | 7/2007 | Kocienda et al. | |
| 2007/0198566 A1 | 8/2007 | Sustik | |
| 2007/0229323 A1 | 10/2007 | Plachta et al. | |
| 2007/0229476 A1 | 10/2007 | Huh | |
| 2007/0257896 A1 | 11/2007 | Huh | |
| 2007/0260595 A1 | 11/2007 | Beatty et al. | |
| 2007/0285958 A1 | 12/2007 | Platchta et al. | |
| 2007/0288449 A1 | 12/2007 | Datta et al. | |
| 2008/0059876 A1 | 3/2008 | Hantler et al. | |
| 2008/0167858 A1 | 7/2008 | Christie et al. | |
| 2008/0168366 A1 | 7/2008 | Kocienda et al. | |
| 2008/0259022 A1 | 10/2008 | Mansfield et al. | |
| 2008/0316183 A1 | 12/2008 | Westerman et al. | |
| 2009/0174667 A1 | 7/2009 | Kocienda et al. | |
| 2009/0249198 A1 | 10/2009 | Davis et al. | |
| 2009/0327977 A1 | 12/2009 | Bachfischer et al. | |
| 2010/0023318 A1 | 1/2010 | Lemoine | |
| 2010/0036655 A1 | 2/2010 | Cecil et al. | |
| 2010/0177056 A1 | 7/2010 | Kocienda et al. | |
| 2010/0192086 A1 | 7/2010 | Kocienda et al. | |
| 2010/0325588 A1 | 12/2010 | Reddy et al. | |

FOREIGN PATENT DOCUMENTS

| | | | |
|---|---|---|---|
| EP | 1674976 A2 | 6/2006 | |
| GB | 2332293 A | 6/1999 | |
| GB | 2337349 A | 11/1999 | |
| GB | 2351639 A | 1/2001 | |
| GB | 2380583 A | 4/2003 | |
| JP | 8-249122 A | 9/1996 | |
| JP | 9-81320 A | 3/1997 | |
| JP | 11-53093 A | 2/1999 | |
| JP | 2000-29630 A | 1/2000 | |
| JP | 2001-521793 A | 11/2001 | |
| JP | 2002-518721 A | 6/2002 | |
| JP | 2002-222039 A | 8/2002 | |
| JP | 2003-216312 A | 7/2003 | |
| WO | WO 98/33111 | 7/1998 | |
| WO | 00/38042 A1 | 6/2000 | |
| WO | WO 00/38041 | 6/2000 | |
| WO | 03/098417 A2 | 11/2003 | |
| WO | 2004/051392 A2 | 6/2004 | |
| WO | 2005/006442 A1 | 1/2005 | |
| WO | 2005/008899 A1 | 1/2005 | |
| WO | 2006/003590 A2 | 1/2006 | |
| WO | 2006/115946 A2 | 11/2006 | |

OTHER PUBLICATIONS

Final Office Action received for U.S. Appl. No. 11/620,642, mailed on Nov. 29, 2010, 14 pages.
Non-Final Office Action received for U.S. Appl. No. 11/620,642, mailed on Feb. 18, 2011, 16 pages.
Non-Final Office Action received for U.S. Appl. No. 11/620,642, mailed on Mar. 30, 2010, 10 pages.
Notice of Allowance received for U.S. Appl. No. 11/620,642, mailed on Oct. 24, 2011, 8 pages.
Notice of Allowance received for U.S. Appl. No. 11/620,641, mailed on Mar. 18, 2011, 12 pages.
Non-Final Office Action received for U.S. Appl. No. 12/165,554, mailed on Nov. 21, 2011, 12 pages.
Notice of Allowance received for U.S. Appl. No. 12/165,554, mailed on Apr. 2, 2012, 9 pages.
Final Office Action received for U.S. Appl. No. 12/505,382, mailed on Jul. 9, 2012, 35 pages.
Final Office Action received for U.S. Appl. No. 12/505,382, mailed on May 3, 2012, 27 pages.
Non-Final Office Action received for U.S. Appl. No. 12/505,382, mailed on Jan. 5, 2012, 32 pages.
Non-Final Office Action received for U.S. Appl. No. 12/727,219, mailed on Feb. 17, 2012, 12 pages.
Non-Final Office Action received for U.S. Appl. No. 13/559,495, mailed on Dec. 7, 2012, 10 pages.
Non-Final Office Action received for U.S. Appl. No. 13/559,495, mailed on Dec. 16, 2013, 6 pages.
Notice of Allowance received for U.S. Appl. No. 13/559,495, mailed on Aug. 15, 2013, 6 pages.
Notice of Allowance received for U.S. Appl. No. 13/559,495, mailed on Jun. 25, 2013, 6 pages.
International Preliminary Report on Patentability received for PCT Patent Application No. PCT/US2007/088873, mailed on Jul. 7, 2009, 6 pages.
Masui, Toshiyuki, "POBox: An Efficient Text Input Method for Handheld and Ubiquitous Computers", Proceedings of the international Symposium on Handheld and Ubiquitous Computer (HUC '99), Sep. 1999, 12 pages.
Centroid, available at "http://faculty.evansville.edu/ck6/tcenters/class/centroid.html", Apr. 28, 2006, 1 page.
Centroid, http://www.pballew.net/centroid.html, Apr. 28, 2006, 3 pages.
Compare Keyboards with the Keyboard Compatibility Chart, Learn more About Alternative Keyboards, Solutions for Humans, available at "http://www.keyalt.com/kkeybrdp.htm", Dec. 8, 2005, 5 pages.
Devices, Technology Loan Catalog, available at "http://www.tsbvi.edu/outreach/techioan/catalog.html", retrieved on Dec. 8, 2005, 10 pages.
Fastap, DigitWireless, available at "http://www.digitwireless.com/about/faq.html", Dec. 6, 2005, 5 pages.
Fastap Keypads Redefine Mobile Phones, DigitWireless, available at "http://www.digitwireless.com", retrieved on Nov. 18, 2005, 10 pages.
Four-Button Keyboard, WikiPodlinux, available at "http://ipodlinux.org/Four_Button_Keyboard", retrieved on Dec. 5, 2005, 2 pages.
Introducing the Ultimate Smartphone Keypad, Delta II Keypads, available at "http://www.chicagologic.com", retrieved on Nov. 18, 2005, 2 pages.
LG Develops New Touch Pad Cell Phones, Textually, available at "http://textually.ora/textually/archives/2005/06/009903.html", retrieved on Nov. 18, 2005, 1 page.
Microsoft New-Smart Phone Interface: Your Thumb, Textually, available at "htto://www.textuallv.org", retrieved on Nov. 18, 2005, 2 pages.
P900 User Guide, Sony Ericsson Mobile Communications AB, XP002479719, available at "http://www.sonyericcson.com/downloads/P900_UG_R1b_EN.pdf", Sep. 2003, 98 pages.
Samsung Releases Keyboard Phone in US, Textually, available at "http://www.textually.ora/textually/archives/2005/11 /01 0482.htm", retrieved on Nov. 18, 2005, 1 page.
T9 Text Input for Keypad Devices, Available at "http://tegic.com", 1 page.
Text Input (legacy), WikiPodlinux, available at "http://ipodlinux.org/Text Input_%28legacy%29", retrieved on Dec. 5, 2005, 8 pages.
Text Input Concepts, WikiPodlinux, available at "http:l/web.archive.ora/web/20051211165254/http:l/ipodlinux.ora/Text_Input_Concepts", Dec. 2005, 3 pages.
Text Input Methods, WikiPodlinux, available at "http://ipodlinux.org/Text_Input_Methods", retrieved on Dec. 5, 2005, 5 pages.
You Heard of Touch Screens Now Check Out Touch Keys, Phoneyworld, available at "http://www.phonevworld.com", retrieved on Nov. 18, 2005, 2 pages.
International Preliminary Report on Patentability received for PCT Patent Application No. PCT/US2007/060119, issued on Jul. 8, 2008, 13 pages.
International Search Report and Written Opinion received for PCT Patent Application No. PCT/US2007/060119, mailed on Apr. 11, 2008, 18 pages.

(56) References Cited

OTHER PUBLICATIONS

Invitation to Pay Additional Fees received for PCT Patent Application No. PCT/US2007/060119, mailed on Jan. 2, 2008, 9 pages.
International Preliminary Report on Patentability received for PCT Patent Application No. PCT/US2007/088872, Issued on Jul. 7, 2009, 7 pages.
International Search Report and Written Opinion received for PCT Patent Application No. PCT/US2007/088904, mailed on Sep. 15, 2008, 16 pages.
Invitation to Pay Additional Fees received for PCT Patent Application No. PCT/US2007/088904, mailed on Jun. 23, 2008, 8 pages.
International Search Report and Written Opinion received in International Application No. PCT/US2008/050426, mailed on Jun. 13, 2008, 10 pages.
Office Action received for European Patent Application No. 07709955.4, mailed on Jul. 31, 2009, 6 pages.
Office Action Received for European Patent Application No. 07709955.4, mailed on Oct. 10, 2008, 5 pages.
Summons to Attend Oral Proceedings received for European Patent Application No. 07709955.4, mailed on May 11, 2010, 8 pages.
Office Action received for Chinese Patent Application No. 200780006621.9, mailed on Aug. 16, 2010, 4 pages (English Translation only).
Office Action received in Japanese Patent Application No. 2008-549646, mailed on Apr. 27, 2011, 4 pages (2 pages on English Translation and 2 pages of Official copy).
Office Action received for Korean Patent Application No. 10-2008-7019114, mailed on Aug. 31, 2010, 4 pages (1 page of English Translation and 3 pages of Official copy).
Non-Final Office Action received for U.S. Appl. No. 11/228,737, mailed on Mar. 19, 2009, 17 pages.
Notice of Allowance received for U.S. Appl. No. 11/459,606, mailed on Dec. 18, 2009, 7 pages.
Final Office Action received for U.S. Appl. No. 11/459,615, mailed on Dec. 8, 2009, 12 pages.
Non-Final Office Action received for U.S. Appl. No. 11/459,615, mailed on Apr. 13, 2010, 10 pages.
Non-Final Office Action received for U.S. Appl. No. 11/549,624, mailed on Sep. 30, 2008, 8 pages.
Non Final Office Action received for U.S. Appl. No. 11/620,641, mailed on Nov. 20, 2009, 20 pages.
Notice of Allowance received for U.S. Appl. No. 11/620,641, mailed on Apr. 13, 2011, 6 pages.
Final Office Action received for U.S. Appl. No. 11/961,663 mailed on Mar. 17, 2011, 24 pages.
Non-Final Office Action received for U.S. Appl. No. 11/961,663, mailed on Nov. 18, 2010, 22 pages.
Non-Final Office Action received for U.S. Appl. No. 12/727,217, mailed on May 11, 2012, 22 pages.
Non-Final Office Action received for U.S. Appl. No. 12/727,220, mailed on Feb. 16, 2012, 15 pages.
Non-Final Office Action received for U.S. Appl. No. 12/727,221, mailed on Feb. 16, 2012, 18 pages.
Non-Final Office Action received for U.S. Appl. No. 13/220,202, mailed on Jun. 12, 2014, 13 pages.
Notice of Allowance received for U.S. Appl. No. 13/220,202, mailed on Nov. 25, 2014, 8 pages.
Final Office Action received for U.S. Appl. No. 13/559,495, mailed on Sep. 8, 2014, 7 pages.
Notice of Allowance received for U.S. Appl. No. 13/559,495, mailed on Dec. 12, 2014, 5 pages.
Notice of Allowance received for U.S. Appl. No. 13/559,495, mailed on Mar. 13, 2015, 5 pages.
Casario, M., "Hands on Macromedia World: Touch Screen Keypad for Mobile Phone by DoCoMo", available at "http://casario.bloqs.com/mmworld/2005/10/touch_screen_ke.html", retrieved on Nov. 18, 2005, 1 page.

Day, B., "Will Cell Phones Render iPods Obsolete?", available at "http://weblogs.iavanet/pub/wig/883", Dec. 12, 2005, 3 pages.
Hardy, Ed, "Apple Adds iTunes Wi-Fi Music Store to iPhone", Brighthand, available online at "http://www.brighthand.com/printArticle.asp?newsID=13379", Sep. 28, 2007, 1 page.
O'Neal, "Smart Phones with Hidden Keyboards", available at "http://msc.com/4250-6452_16-6229969-1.html", Nov. 18, 2005, 3 pages.
Pogue, David, "iPhone: The Missing Manual", Aug. 2007, p. 22.
Sears et al., "Data Entry for Mobile Devices Using Soft Keyboards: Understanding the Effects of Keyboard Size and User Tasks", Abstract, Int'l Journal of Human-Computer Interaction, vol. 16, No. 2, 2003, 1 page.
Office Action dated Apr. 1, 2010, received in Australian Patent Application No. 2007342164, which corresponds to U.S. Appl. No. 11/620,641.
Office Action dated Nov. 25, 2010, received in Chinese Patent Application No. 200780052020.1, which corresponds to U.S. Appl. No. 11/620,641.
Office Action dated Dec. 7, 2010, received in European Patent Application No. 07 869 922.0, which corresponds to U.S. Appl. No. 11/620,641.
Final Office Action dated Jun. 25, 2010, received in U.S. Appl. No. 11/620,641.
Office Action dated May 26, 2010, received in European Application No. 07 869 922.0, which corresponds to U.S. Appl. No. 11/620,641.
Office Action dated May 26, 2010, received in European Application No. 07 869 923.8, which corresponds to U.S. Appl. No. 11/620,642.
Notice of Allowance dated Jun. 3, 2010, received in U.S. Appl. No. 11/549,624.
Final Office Action dated Feb. 1, 2010, received in U.S. Appl. No. 11/549,624.
Office Action dated Nov. 20, 2009, received in U.S. Appl. No. 11/620,641 (related).
Office Action dated Apr. 10, 2009, for U.S. Appl. No. 11/549,624.
Office Action dated May 22, 2009, for U.S. Appl. No. 11/459,615.
Office Action dated May 28, 2009, for U.S. Appl. No. 11/459,606.
Office Action dated Jul. 22, 2009, for U.S. Appl. No. 11/549,624.
CALL Centre 1999, "Word Prediction," Copyright (c) The CALL Centre & Scottish Executive Education Dept., pp. 63-73.
Dyslexic.com, "AlphaSmart 3000 with CoWriter SmartApplet: Don Johnston Special Needs," http://www.dyslexic.com/procuts.php?catid=2&pid=465&PHPSESSID=2511b800000f7da . . . , downloaded Dec. 6, 2005, 13 pages.
Glossary of Adaptive Technologies: Word Prediction, http://www.utoronto.ca/atrc/reference/techwordpred.html, printed Dec. 6, 2005, 5 pages.
MacTech, "KeyStrokes 3.5 for Mac OS X Boosts Word Prediction," http://www.mactech.com/news/?p=1007129, printed Jan. 7, 2008, 3 pages.
Mobile Tech News, "T9 Text Input Software Updated," http://www.mobiletechnews.com/info/2004/11/23/122155.html, Nov. 28, 2004, 4 pages.
NCIP: Word Prediction Collection, "What is Word Prediction?" http://www2.edc.org/NCIP/library/wp/What_is.htm, printed Jan. 7, 2008, 2 pages.
NCIP: Word Prediction Collection, NCIP Library: Word Prediction Collection, http://www2.edc.org/NCIP/library/wp/toc.htm, printed Jan. 7, 2008, 4 pages.
International Search Report and Written Opinion for International Application PCT/US2007/088872, mailed May 8, 2008.
International Search Report and Written Opinion for International Application PCT/US2007/088673, mailed May 8, 2008.
Non-Final Office Action received for U.S. Appl. No. 13/310,592, mailed on Jun. 22, 2015, 9 pages.
Notice of Allowance received for U.S. Appl. No. 13/310,592, mailed on Jul. 15, 2015, 8 pages.
Plaisant, Catherine, "Touchscreen Toggle Design", available at <http://www.youtube.com/watch?v=wFWbdxicvK0>, retrieved on Nov. 15, 2013, 2 pages.

\* cited by examiner

METHOD, SYSTEM, AND GRAPHICAL USER INTERFACE FOR PROVIDING WORD RECOMMENDATIONS

RELATED APPLICATIONS

This application is a continuation of U.S. patent application Ser. No. 11/620,642, filed Jan. 5, 2007, now U.S. Pat. No. 8,074,172 which is incorporated herein by reference in its entirety.

This application is related to U.S. patent application Ser. No. 11/620,641, filed Jan. 5, 2007, entitled "Method and System for Providing Word Recommendations for Text Input," and U.S. patent application Ser. No. 13/310,592, filed Dec. 2, 2011, entitled "Method, System, and Graphical User Interface for Providing Word Recommendations," which are incorporated herein by reference in their entirety.

TECHNICAL FIELD

The disclosed embodiments relate generally to text input on portable electronic devices, and more particularly, to a method, system, and graphical user interface for providing word recommendations on a portable electronic device.

BACKGROUND

In recent years, the functional capabilities of portable electronic devices have increased dramatically. Current devices enable communication by voice, text, and still or moving images. Communication by text, such as by email or short message service (SMS), has proven to be quite popular.

However, the size of these portable communication devices also restricts the size of the text input device, such as a physical or virtual keyboard, in the portable device. With a size-restricted keyboard, designers are often forced to make the keys smaller or overload the keys. Both may lead to typing mistakes and thus more backtracking to correct the mistakes. This makes the process of inputting text on the devices inefficient and reduces user satisfaction with such portable devices.

Accordingly, there is a need for more efficient ways of entering text into portable devices.

SUMMARY

The above deficiencies and other problems associated with user interfaces for portable devices are reduced or eliminated by the disclosed device that includes a text input interface that provides word recommendations.

According to some embodiments, a computer-implemented method may be performed at a portable electronic device with a keyboard and a touch screen display. The method includes: in a first area of the touch screen display, displaying a current character string being input by a user with the keyboard; in a second area of the touch screen display, displaying the current character string or a portion thereof and a suggested replacement character string for the current character string; replacing the current character string in the first area with the suggested replacement character string if the user activates a key on the keyboard associated with a delimiter; replacing the current character string in the first area with the suggested replacement character string if the user performs a first gesture on the suggested replacement character string displayed in the second area; and keeping the current character string in the first area if the user performs a second gesture on the current character string or the portion thereof displayed in the second area.

According to some embodiments, a graphical user interface on a portable electronic device with a keyboard and a touch screen display includes a first area of the touch screen display that displays a current character string being input by a user with the keyboard, and a second area of the touch screen display that displays the current character string or a portion thereof and a suggested replacement character string for the current character string. The current character string in the first area is replaced with the suggested replacement character string if the user activates a key on the keyboard associated with a delimiter. The current character string in the first area is replaced with the suggested replacement character string if the user performs a gesture on the suggested replacement character string in the second area. The current character string in the first area is kept if the user performs a gesture on the current character string or the portion thereof displayed in the second area.

According to some embodiments, a portable electronic device includes a touch screen display, one or more processors, memory, and a program. The program is stored in the memory and configured to be executed by the one or more processors. The program includes: instructions for displaying, in a first area of the touch screen display, a current character string being input by a user with the keyboard; instructions for displaying, in a second area of the touch screen display, the current character string and a suggested replacement character string for the current character string; instructions for replacing the current character string in the first area with the suggested replacement character string if the user activates a key on the keyboard associated with a delimiter; instructions for replacing the current character string in the first area with the suggested replacement character string if the user performs a first gesture on the suggested replacement character string displayed in the second area; and instructions for keeping the current character string in the first area if the user performs a second gesture on the current character string or the portion thereof displayed in the second area.

According to some embodiments, a computer-program product includes a computer readable storage medium and a computer program mechanism embedded therein. The computer program mechanism includes instructions, which when executed by a portable electronic device with a touch screen display, cause the device to: in a first area of the touch screen display, display a current character string being input by a user with the keyboard; in a second area of the touch screen display, display the current character string or a portion thereof and a suggested replacement character string for the current character string; replace the current character string in the first area with the suggested replacement character string if the user activates a key on the keyboard associated with a delimiter; replace the current character string in the first area with the suggested replacement character string if the user performs a first gesture on the suggested replacement character string displayed in the second area; and keep the current character string in the first area if the user performs a second gesture on the current character string or the portion thereof displayed in the second area.

According to some embodiments, a portable electronic device with a touch screen display includes: means for displaying a current character string being input by a user with the keyboard in a first area of the touch screen display; means for displaying the current character string or a portion thereof and a suggested replacement character string for the current character string in a second area of the touch screen display;

means for replacing the current character string in the first area with the suggested replacement character string if the user activates a key on the keyboard associated with a delimiter; means for replacing the current character string in the first area with the suggested replacement character string if the user performs a first gesture on the suggested replacement character string displayed in the second area; and means for keeping the current character string in the first area if the user performs a second gesture on the current character string or the portion thereof displayed in the second area.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
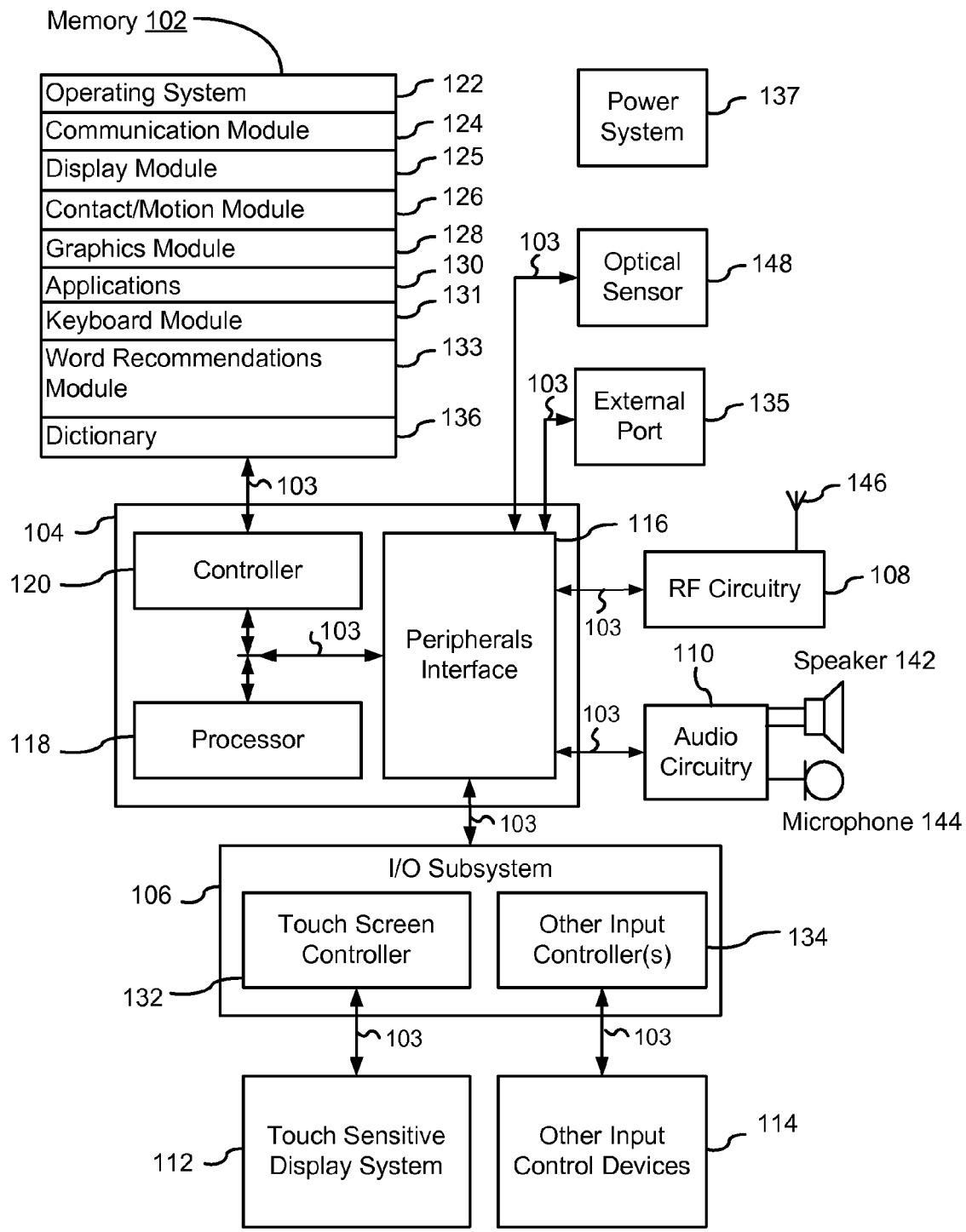
FIG. 1 is a block diagram illustrating a portable electronic device in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Embodiments of user interfaces and associated processes for using a portable electronic device are described. In some embodiments, the device is a portable communications device such as a mobile telephone. The user interface may include a click wheel in addition to a touch screen. A click wheel is a physical user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. For simplicity, in the discussion that follows, a portable electronic device (e.g., a cellular telephone that may also contain other functions, such as text messaging, PDA and/or music player functions) that includes a touch screen is used as an exemplary embodiment. It should be understood, however, that the user interfaces and associated processes may be applied to other devices, such as personal digital assistants (PDA's), personal computers and laptops, which may include one or more other physical user-interface devices, such as a click wheel, a keyboard, a mouse and/or a joystick.

The device may support a variety of applications, such as one or more telephone applications, a text messaging application, a word processing application, an email application, a web browsing application, and a music player. The music player may be compatible with one or more file formats, such as MP3 and/or AAC. In an exemplary embodiment, the device includes an iPod music player (iPod trademark of Apple Inc.).

The various applications that may be executed on the device may use at least one common physical user-interface device, such as the touch screen. In embodiments that include a touch screen, one or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent to a user.

The user interfaces may include one or more keyboard embodiments displayed on a touch screen. The keyboard embodiments may include standard (QWERTY) and/or non-standard configurations of symbols on the displayed icons of the keyboard. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the keyboard embodiments.

Attention is now directed to an embodiment of a portable communications device. FIG. 1 is a block diagram illustrating an embodiment of a device 100, such as a portable electronic device having a touch-sensitive display 112. The touch-sensitive display 112 is sometimes called a "touch screen" for convenience. The device 100 may include a memory controller 120, one or more data processors, image processors and/or central processing units 118 and a peripherals interface 116. The memory controller 120, the one or more processors 118 and/or the peripherals interface 116 may be separate components or may be integrated, such as in one or more integrated circuits 104. The various components in the device 100 may be coupled by one or more communication buses or signal lines 103.

If the device 110 includes picture taking capabilities, the peripherals interface 116 may be coupled to an optical sensor 148, such as a CMOS or CCD image sensor. The peripherals interface 116 is also coupled to RF circuitry 108; audio circuitry 110; and/or an input/output (I/O) subsystem 106. The audio circuitry 110 may be coupled to a speaker 142 and a micro-phone 144. The device 100 may support voice recognition and/or voice replication. The RF circuitry 108 may be coupled to one or more antennas 146 and may allow communication with one or more additional devices, computers and/or servers using a wireless network. The device 100 may support a variety of communications protocols, including code division multiple access (CDMA), Global System for Mobile Communications (GSM), Enhanced Data GSM Environment (EDGE), Wi-Fi (such as IEEE 802.11a, IEEE 802.11b, IEEE 802.11g and/or IEEE 802.11n), Bluetooth, Wi-MAX, a protocol for email, instant messaging, and/or a short message service (SMS), or any other suitable communication protocol, including communication protocols not yet developed as of the filing date of this document. In an exemplary embodiment, the device 100 may be, at least in part, a mobile phone (e.g., a cellular telephone).

The I/O subsystem 106 may include a touch screen controller 132 and/or other input controller(s) 134. The touch-screen controller 132 is coupled to a touch-sensitive screen or touch sensitive display system 112. The touch screen 112 and touch screen controller 132 may detect contact and any movement or break thereof using any of a plurality of touch sensitivity technologies now known or later developed, including but not limited to capacitive, resistive, infrared, and surface acoustic wave technologies, as well as other proximity sensor arrays or other elements for determining one or more points of contact with the touch-sensitive screen 112. A touch-sensitive display in some embodiments of the display system 112 may be analogous to the multi-touch sensitive tablets described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference. However, a touch screen in the display system 112 displays visual output from the portable device 100, whereas touch sensitive tablets do not provide visual output. The touch-sensitive screen 112 may have a resolution in excess of 100 dpi. In an exemplary embodiment, the touch-sensitive screen 112 has a resolution of approximately 168 dpi. The other input controller(s) 134 may be coupled to other input/control devices 114, such as one or more buttons. In some alternate embodiments, input controller(s) 134 may be coupled to any (or none) of the following: a keyboard, infrared port, USB port, and/or a pointer device such as a mouse. The one or more buttons (not shown) may include an up/down button for volume control of the speaker 142 and/or the microphone 144. The one or more buttons (not shown) may include a push button. A quick press of the push button (not shown) may disengage a lock of the touch screen 112. A longer press of the push button (not shown) may turn power to the device 100 on or off. The user may be able to customize a functionality of one or more of the buttons. The touch screen 112 may be used to implement virtual or soft buttons and/or one or more keyboards.

A touch-sensitive display in some embodiments of the display system 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

In some embodiments, the device 100 may include circuitry for supporting a location determining capability, such as that provided by the Global Positioning System (GPS). In some embodiments, the device 100 may be used to play back recorded music, such as one or more files, such as MP3 files or AAC files. In some embodiments, the device 100 may include the functionality of an MP3 player, such as an iPod (trademark of Apple Inc.). In some embodiments, the device 100 may include a multi-pin (e.g., 30-pin) connector that is compatible with the iPod.

The device 100 also includes a power system 137 for powering the various components. The power system 137 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The device 100 may also include one or more external ports 135 for connecting the device 100 to other devices.

The memory controller 120 may be coupled to memory 102, which may include one or more types of computer readable medium. Memory 102 may include high-speed random access memory and/or non-volatile memory, such as one or more magnetic disk storage devices, one or more optical storage devices, and/or flash memory. Memory 102 may store an operating system 122, such as Darwin, RTXC, LINUX, UNIX, OS X, WINDOWS, or an embedded operating system such as VxWorks. The operating system 122 may include procedures (or sets of instructions) for handling basic system services and for performing hardware dependent tasks. Memory 102 may also store communication procedures (or sets of instructions) in a communication module 124. The communication procedures may be used for communicating with one or more additional devices, one or more computers and/or one or more servers. The memory 102 may include a display module (or a set of instructions) 125, a contact/motion module (or a set of instructions) 126 to determine one or more points of contact and/or their movement, and a graphics module (or a set of instructions) 128. The graphics module 128 may support widgets, that is, modules or applications with embedded graphics. The widgets may be implemented using JavaScript, HTML, Adobe Flash, or other suitable computer program languages and technologies.

The memory 102 may also include one or more applications 130. Examples of applications that may be stored in memory 102 include telephone applications, email applications, text messaging or instant messaging applications, memo pad applications, address books or contact lists, calendars, picture taking and management applications, and music playing and management applications. The applications 130 may include a web browser (not shown) for rendering pages written in the Hypertext Markup Language (HTML), Wireless Markup Language (WML), or other languages suitable for composing web pages or other online content.

Also included in the memory 102 are a keyboard module (or a set of instructions) 131, a word recommendations module (or a set of instructions) 133, and a dictionary 136. The keyboard module 131 operates one or more soft keyboards. The word recommendations module 133 determines word completion or replacement recommendations for text entered by the user. The dictionary 136 includes a list of words in a language, from which word recommendations are drawn. In some embodiments, the dictionary also includes usage frequency rankings associated with the words in the dictionary.

Each of the above identified modules and applications correspond to a set of instructions for performing one or more functions described above. These modules (i.e., sets of instructions) need not be implemented as separate software programs, procedures or modules. The various modules and sub-modules may be rearranged and/or combined. Memory 102 may include additional modules and/or sub-modules, or fewer modules and/or sub-modules. Memory 102, therefore, may include a subset or a superset of the above identified modules and/or sub-modules. Various functions of the device 100 may be implemented in hardware and/or in software, including in one or more signal processing and/or application specific integrated circuits.

Figure 2:
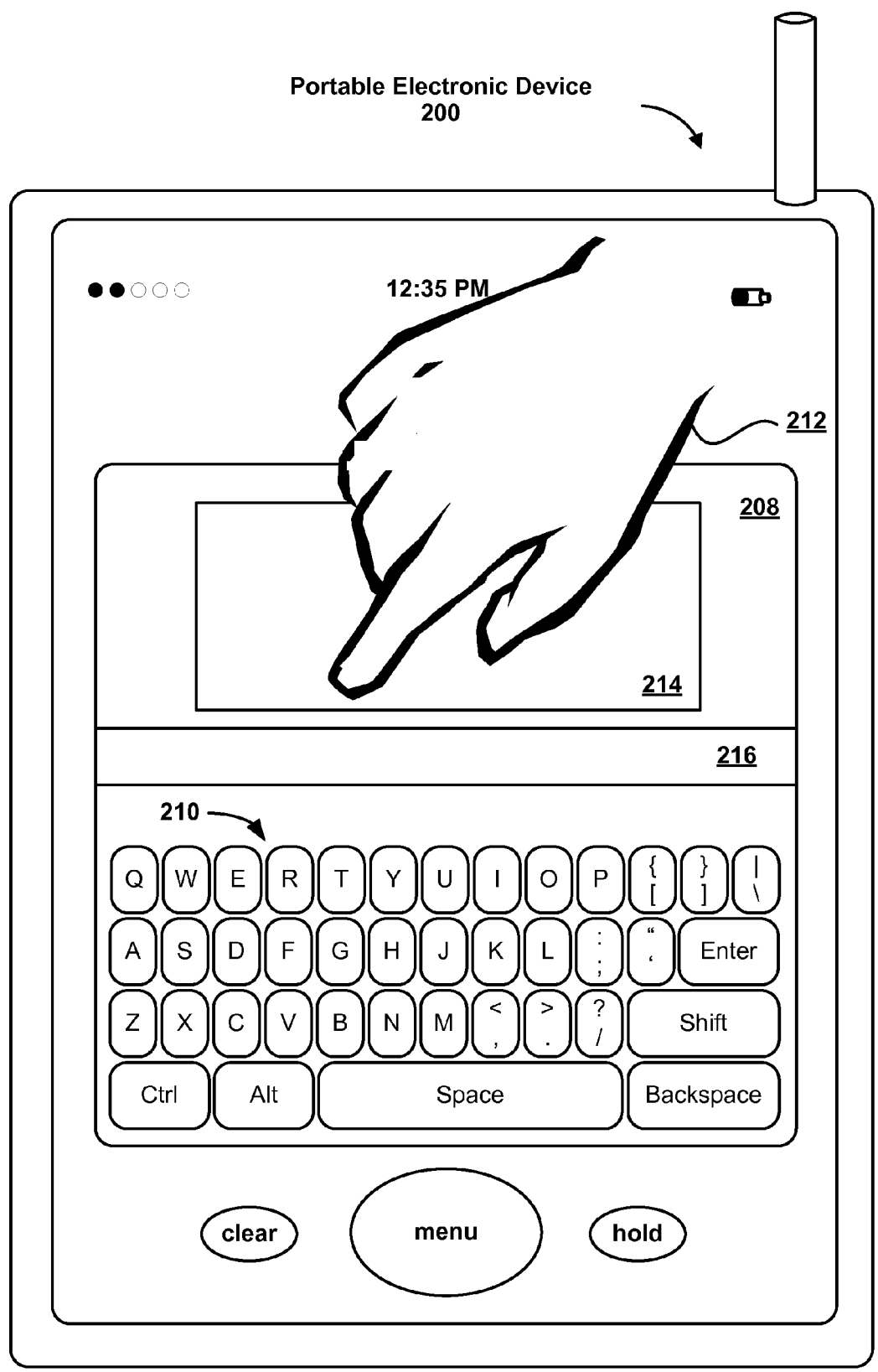
FIG. 2 illustrates a portable electronic device having a touch screen and a soft keyboard in accordance with some embodiments.

Attention is now directed towards embodiments of user interfaces and associated processes that may be implemented on the device 100. FIG. 2 is a schematic diagram illustrating an embodiment of a user interface for a portable electronic device 200. The device 200 includes a touch screen 208. In some embodiments, the touch screen may display one or more trays. A tray is a defined region or area within a graphical user interface. One tray may include a user entry interface, such as a virtual or soft keyboard 210 that includes a plurality of icons. The icons may include one or more symbols. In this embodiment, as well as others described below, a user may select one or more of the icons, and thus, one or more of the corresponding symbols, by making contact or touching the keyboard 210, for example, with one or more fingers 212 (not drawn to scale in the figure). The contact may correspond to the one or more icons. In some embodiments, selection of one or more icons occurs when the user breaks contact with the one or more icons. In some embodiments, the contact may include a gesture, such as one or more taps, one or more swipes (e.g., from left to right, right to left, upward and/or downward) and/or a rolling of a finger (e.g., from right to left, left to right, upward and/or downward) that has made contact with the device 200. In some embodiments, inadvertent contact with an icon may not select a corresponding symbol. For example, a swipe gesture that sweeps over an icon may not select a corresponding symbol if the gesture corresponding to selection is a tap gesture.

Alternatively, in some other embodiments, the keyboard may be a physical keyboard that includes a set of push buttons, a keypad, or the like. The physical keyboard is not a part of the touch screen display. The physical keyboard includes keys that correspond to the plurality of icons described above. A user may select one or more of the icons by pushing the corresponding keys on the physical keyboard.

The device 200 may include a display tray 214, which is displayed on the touch screen 208. The display tray 214 may display one or more of the characters and/or symbols that are selected by the user. The device 200 may also include one or more physical buttons, such as the clear, hold and menu buttons shown in FIG. 2. The menu button may be used to navigate to any application in a set of applications that may be executed on the device 200. Alternatively, in some embodiments, the clear, hold, and/or menu buttons are implemented as soft keys in a GUI in touch screen 208.

Figure 3:
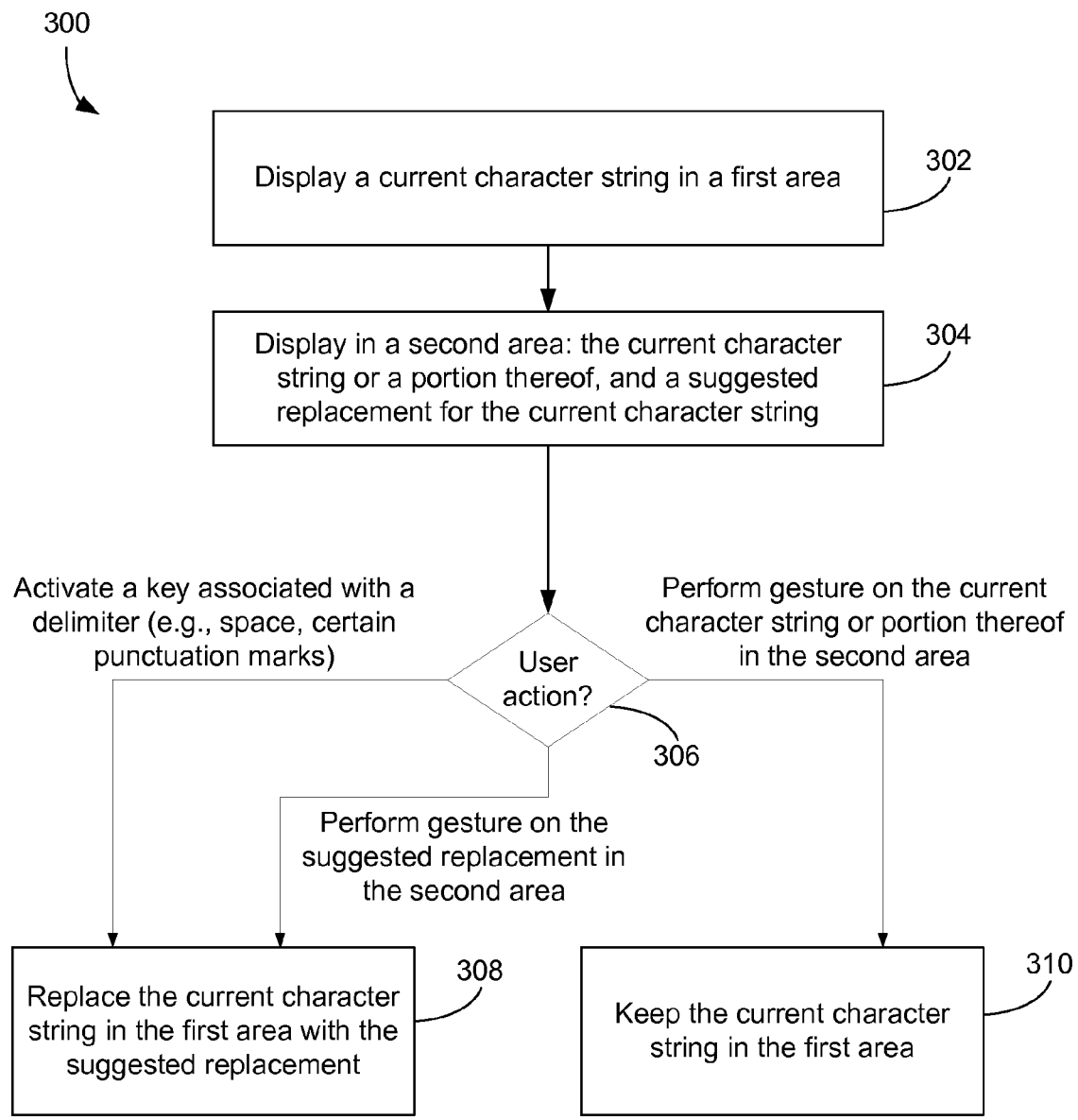
FIG. 3 is a flow diagram illustrating a process for providing word recommendations in accordance with some embodiments.

Attention is now directed to FIG. 3, which illustrates a flow diagram of a process flow 300 for providing word recommendations in accordance with some embodiments. As text is entered by a user on a device, one or more candidate character sequences (suggested replacements) may be provided in response to the entered text. The user may select a candidate character sequence to further extend or to complete the entered text.

A current character string is displayed in a first area of a touch screen of a portable device (302). In some embodiments, the current character string (which is a word, number, symbol, or a combination thereof) is at least a portion of a sequence of characters entered into the device by a user. The user inputs a sequence of characters into the portable device via an input device, such as a keyboard 210, and the device receives and displays the input on the touch screen. In some embodiments, the current character string is the endmost sequence of non-whitespace characters input by the user via the input device and delimited from the rest of the sequence of characters entered by the user by delimiters, such as whitespaces, line breaks, and punctuation.

The current character string (or a portion thereof) and one or more suggested replacements for the current character string is displayed in a second area (for example, a word selection area 216) of the touch screen (304). The second area may be located between the first area and the keyboard. The one or more suggested replacements, which may be words, numbers, or combinations thereof, are selected from a dictionary 136 for display by the device in accordance with predefined procedures. An example of a procedure for selecting suggested replacements for display is described in U.S. patent application Ser. No. 11/620,641, which is hereby incorporated by reference as background information. The user may take one of a plurality of actions with respect to the current character string and the suggested replacement displayed in the second area. If the user action is activation of a key on the keyboard associated with a delimiter (306—Activate a key . . . ), the current character string in the first area of the touch screen is replaced with the suggested replacement (308). The delimiter associated with the activated key may be appended to the end of the suggested replacement in the first area. For example, if the activated key is associated with a comma, a comma is appended to the suggested replacement (which replaces the current character string) in the first area. In some embodiments, delimiters include spaces, line breaks (sometimes called line returns), and terminal punctuation (for example, commas, periods, exclamation points, question marks, and semicolons). In other embodiment, delimiters may include a subset of the delimiters listed above, and may optionally include additional delimiters as well.

If the user action is performance of a first gesture on the suggested replacement in the second area of the touch screen (306—Perform gesture on the suggested replacement . . . ), the current character string in the first area of the touch screen is replaced with the suggested replacement (308). In some embodiments, a whitespace is appended to the end of the suggested replacement in the first area. In some embodiments, the first gesture includes one or more taps on the suggested replacement in the second area.

If the user action is performance of a second gesture on the current character string in the second area (306—Perform gesture on the current character string . . . ), the current character string is maintained in the first area (310). In some embodiments, a whitespace is appended to the end of the current character string in the first area. In some embodiments, the second gesture includes one or more taps on the current character string in the second area.

In some embodiments, the device displays a plurality of suggested replacements in the word selection area. In these embodiments, the user may select the desired replacement by performing a gesture on the desired replacement. However, if the user activates a key associated with the delimiter, a replacement is selected from amongst the plurality in accordance with one or more default rules. For example, a default rule may be that the highest ranked suggested replacement is selected.

In some embodiments, if the current character string in the first area was replaced with the suggested replacement, the user may review the current character string that was replaced. The user may perform a third gesture on the suggested replacement in the first area. After the third gesture is performed, the (original) current character string is displayed in the first area for a predetermined amount of time. In some embodiments, the third gesture includes one or more taps on the suggested replacement in the first area. Further details regarding reviewing the replaced current character string is described below in relation to FIGS. 5A-5B.

Attention is now directed to FIGS. 4A-4I, which illustrate a user interface for providing word recommendations in accordance with some embodiments. In a portable electronic device 200, text 218 entered by the user via a keyboard 210 or other input may be displayed in a first area, e.g. display tray 214. A cursor or insertion marker 220 may be displayed in the display tray 214 to indicate the insertion position of the next entered character.

Figure 4A:
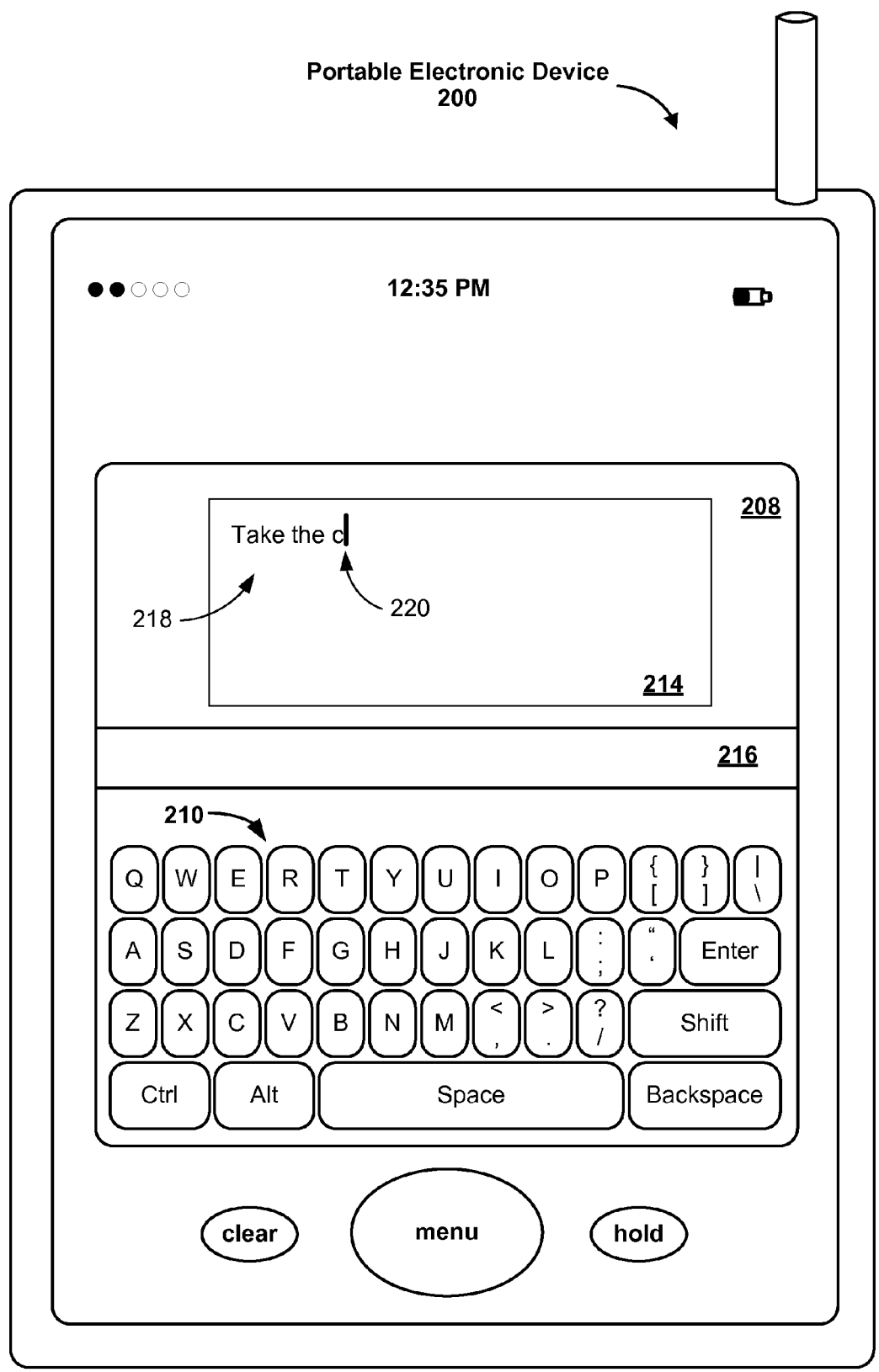
FIGS. 4A-4I illustrate a user interface for providing word recommendations in accordance with some embodiments.
Figure 4B:
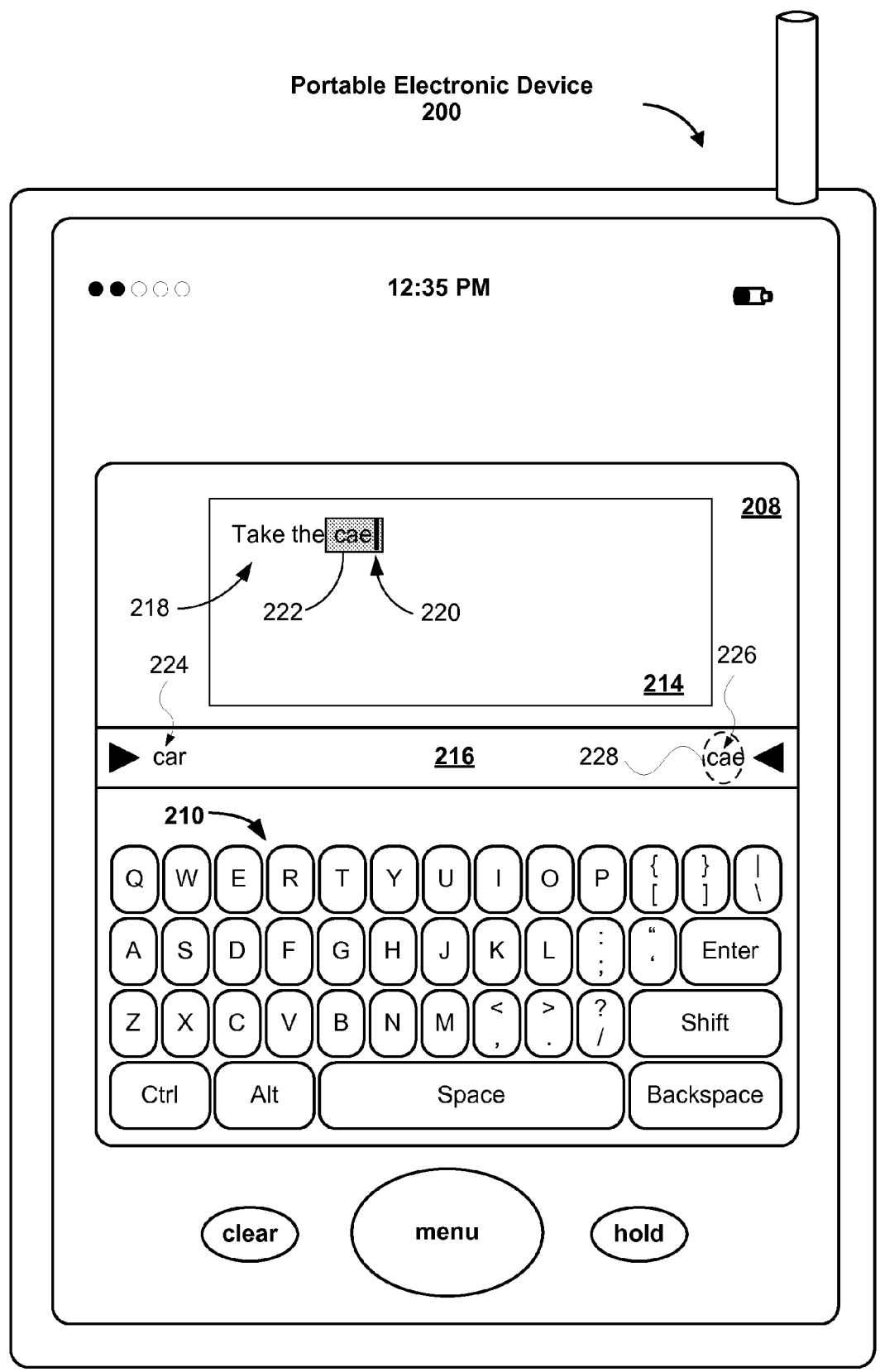

The text 218 may include one or more strings separated by one or more delimiters, such as spaces and punctuation. The end-most string in the text 218 may be highlighted as the current character string 222 (FIG. 4B). The current character string 222 may be a complete or incomplete word. The device 200 may display one or more suggested replacements 224 (for example, "car" in FIG. 4D; "car," "cat," "cabinet," and "candle" in FIG. 4F) in a second area, e.g. word selection area 216. A duplicate 226 of the current character string 222 may also be displayed in the word selection area 216. In some embodiments, the suggested replacement(s) and the current character string duplicate 226 are displayed on opposite sides of the word selection area 216. For example, the suggested replacement(s) may be displayed in the left side of the word selection area 216 and the current character string duplicate 226 may be displayed in the right side of the word selection area 216.

Figure 4C:
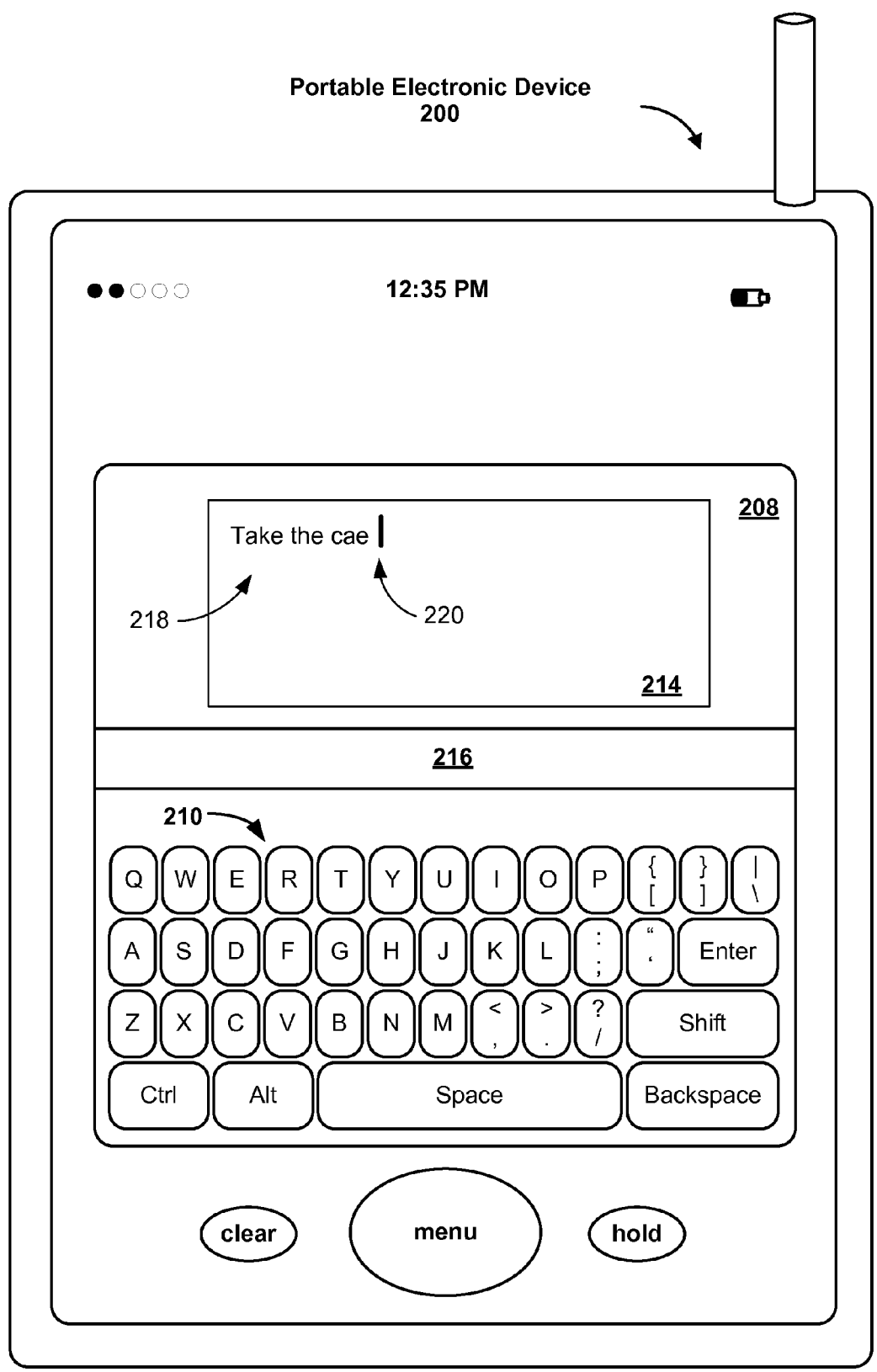
Figure 4D:
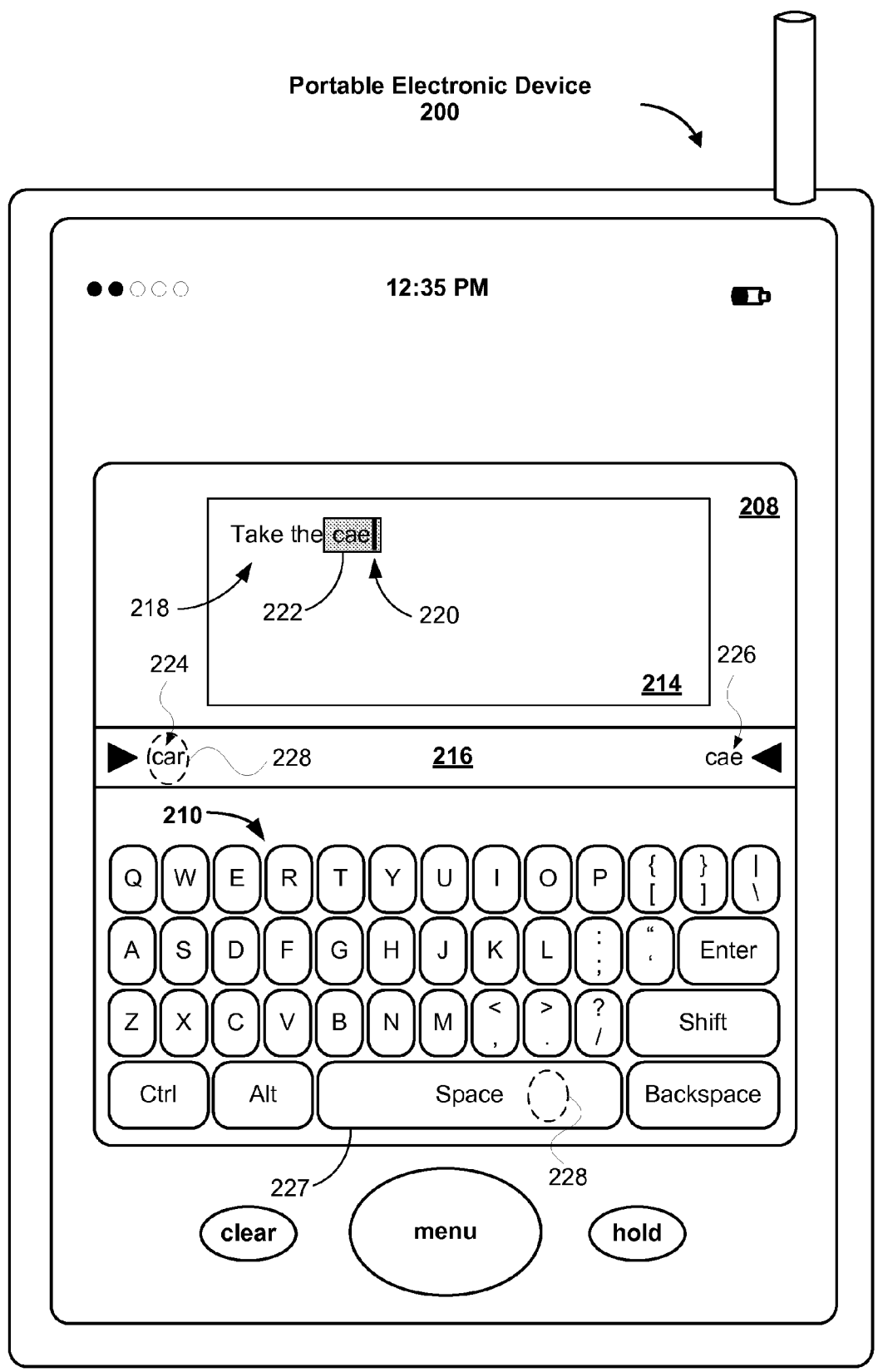
Figure 4E:
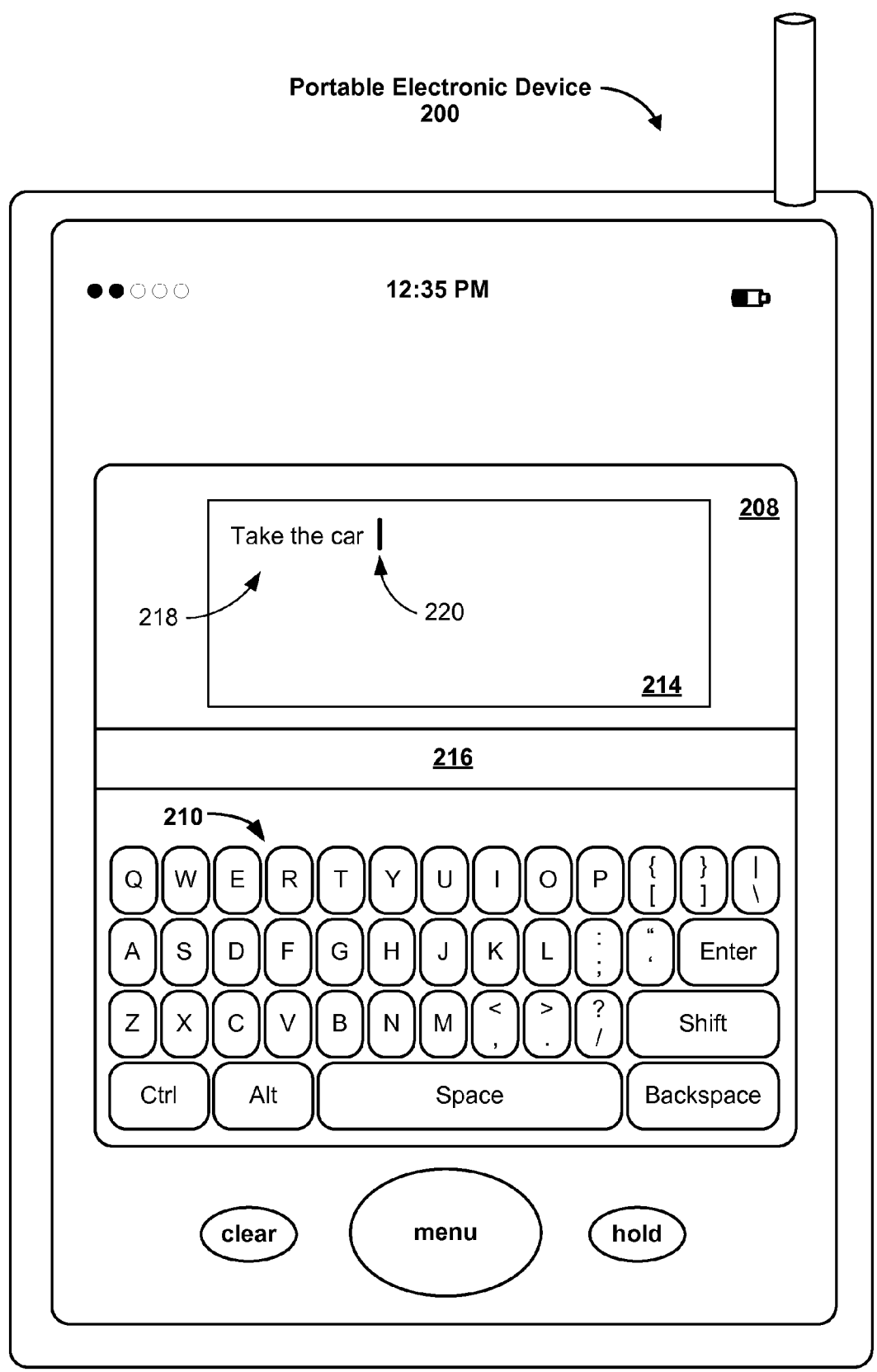

The user may perform a gesture (such as a tap on the touch screen) on either the duplicate 226 of the current character string 222 or the suggested replacement 224. If the user taps on the duplicate 226 of the current character string 222 in the word selection area 216 with a finger 212, as indicated by the finger contact area 228 in FIG. 4B, the current character string 222 is left as is in the display tray 214. If the user taps on the suggested replacement 224 in the word selection area 216 with a finger 212, as indicated by the finger contact area 228 in FIG. 4D, the current character string 222 is replaced in the display tray 214 by the suggested replacement 224 (FIG. 4E).

As an example, the current character string 222 "cae" is highlighted, as shown in FIG. 4B. If the user taps the duplicate 226 of the current character string 222 in the word selection area 216, the current character string "cae" is completed and becomes part of the text 218 for which the device 200 is not providing suggested replacements, as shown in FIG. 4C. In some embodiments, a space is added to the end of the completed current character string, as shown in FIG. 4C. In some embodiments, the completed current character string ("cae" in FIG. 4C) is added to the dictionary 136. If the user taps instead the suggested replacement 224 "car" in the word selection area 216 (FIG. 4D), the current character string "cae" is replaced in the display tray 214 with the suggested replacement "car," as shown in FIG. 4E. In some embodiments, a space is added to the end of the replaced current character string in the display tray 214, as shown in FIG. 4E.

Returning to FIG. 4D, if the user hits (as indicated by the finger contact area 228 on the space bar 227) a key on the keyboard 210 that is associated with a delimiter, such as a space bar 227, the current character string 222 in the display tray 214 is replaced by the suggested replacement 224, and the delimiter associated with the key that was hit by the user is appended to the end of the suggested replacement in the display tray 214.

Figure 4F:
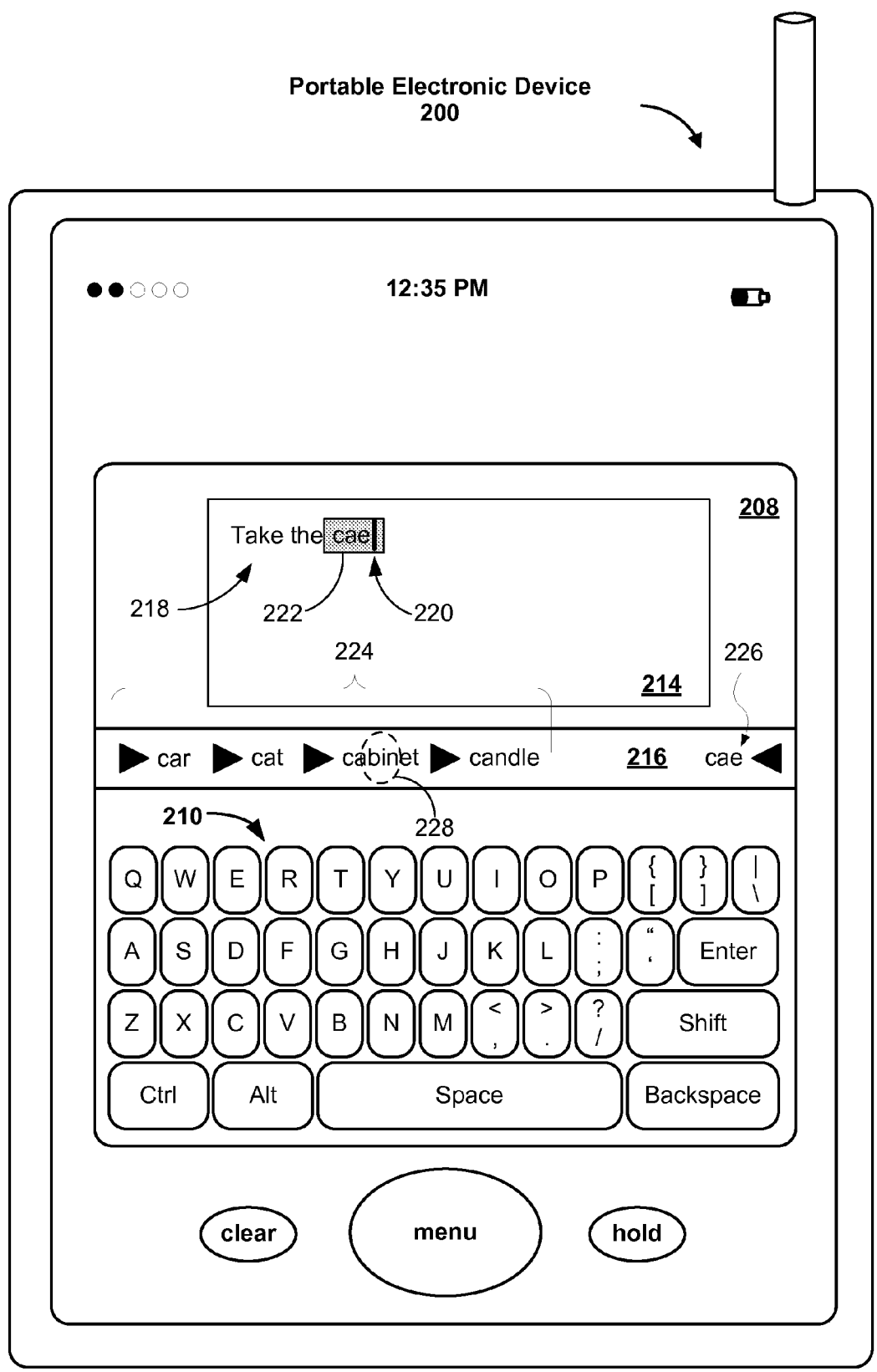
Figure 4G:
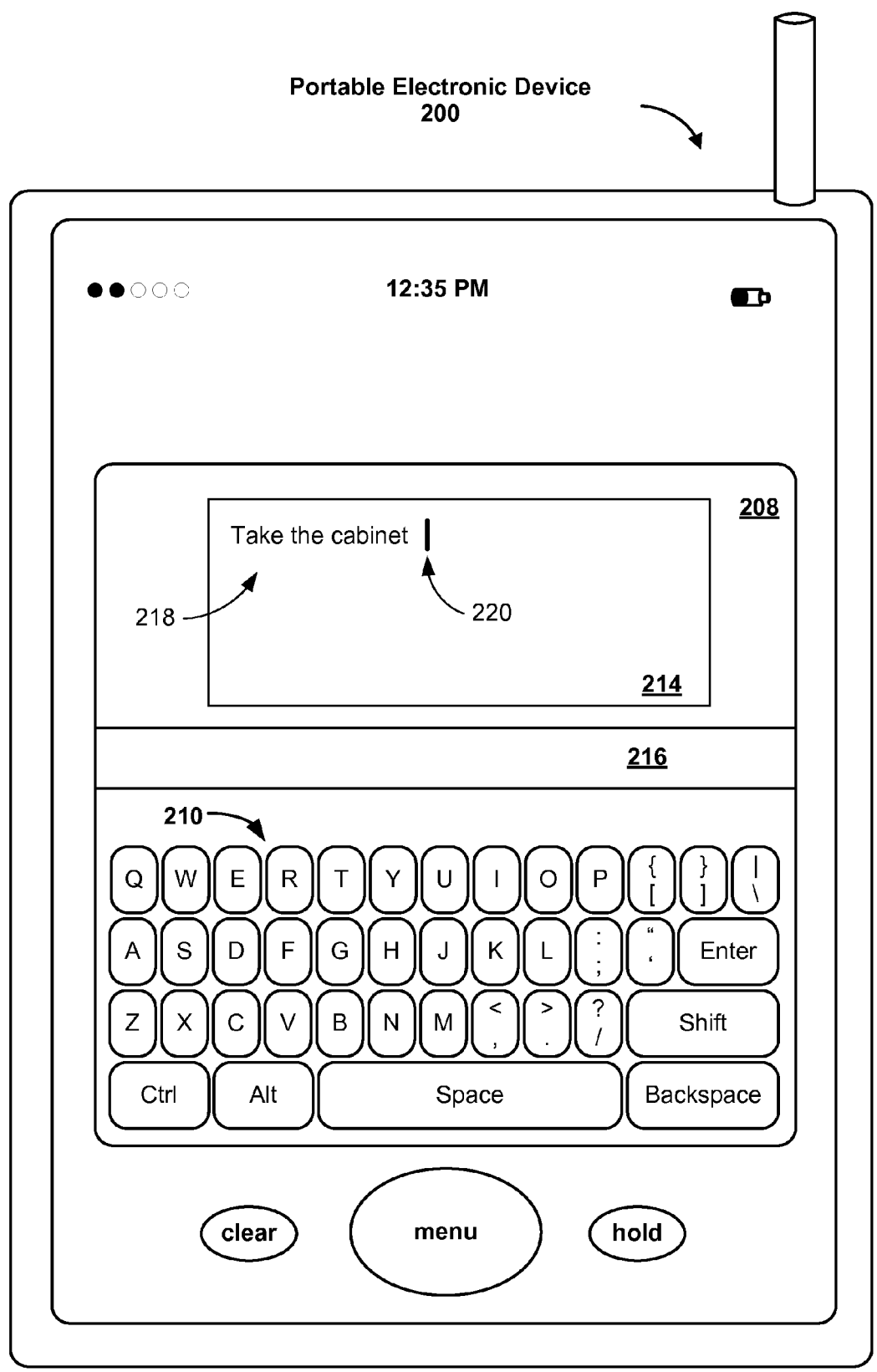

In some embodiments, the device 200 may display a plurality of suggested replacements 224 for a current character sequence 222 in the word selection area 216, as shown in FIG. 4F. A user may perform a gesture (e.g., a tap) on one of the plurality of suggested replacements to select that suggested replacement. The current character sequence 222 is replaced with the selected suggested replacement. As an example, in FIG. 4F, suggested replacements for the current character string "cae" include "car," "cat," "cabinet," and "candle." If the user taps on the suggested replacement "cabinet," as indicated by the contact area 228 in the word selection area 216, the current character string "cae" is replaced in the display tray 214 with the selected replacement "cabinet," as shown in FIG. 4G. If the user hits a key on the keyboard 210 that is associated with a delimiter, the current character string 222 in the display tray 214 may be replaced by the suggested replacement 224 in the word selection area 216 that is highest ranked (e.g., "car" in FIG. 4F). In some embodiments, the suggested replacements 224 are displayed in ranking order (ascending or descending, depending on the particular embodiment and/or user preferences) in the word selection area 216, so that the user may identify which suggested replacement is the highest ranked.

Figure 4H:
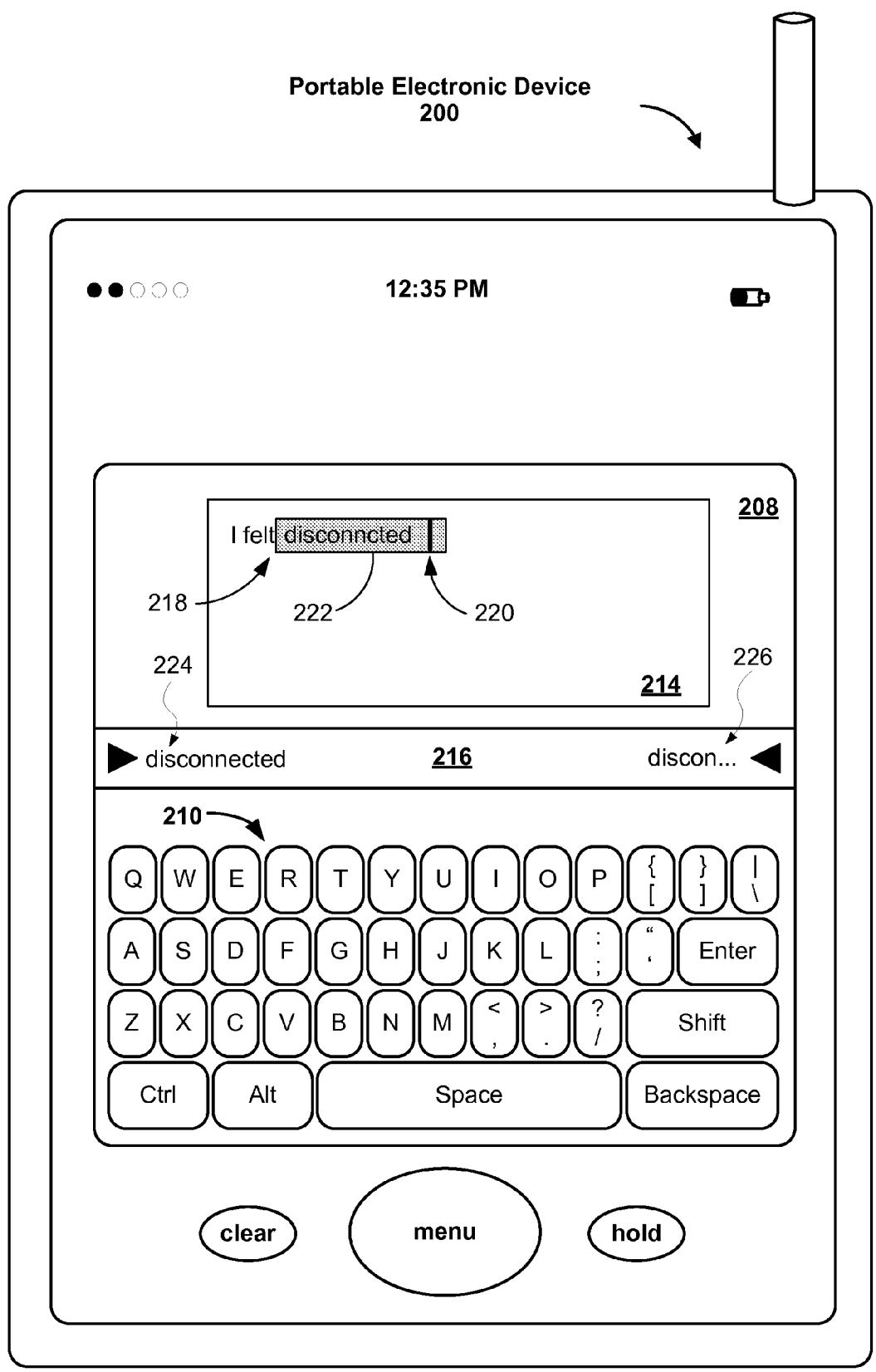

In some embodiments, if the current character string 222 is longer than a predefined length (based on the number of characters), the duplicate 226 of the current character string 222 in the word selection area 216 may show a subset of the characters in the current character string 222. For example, the duplicate 226 may show the first six characters of the current character string 222, as shown in FIG. 4H. As another example, the duplicate 226 may show the first three and the last three characters of the current character string 222.

Figure 4I:
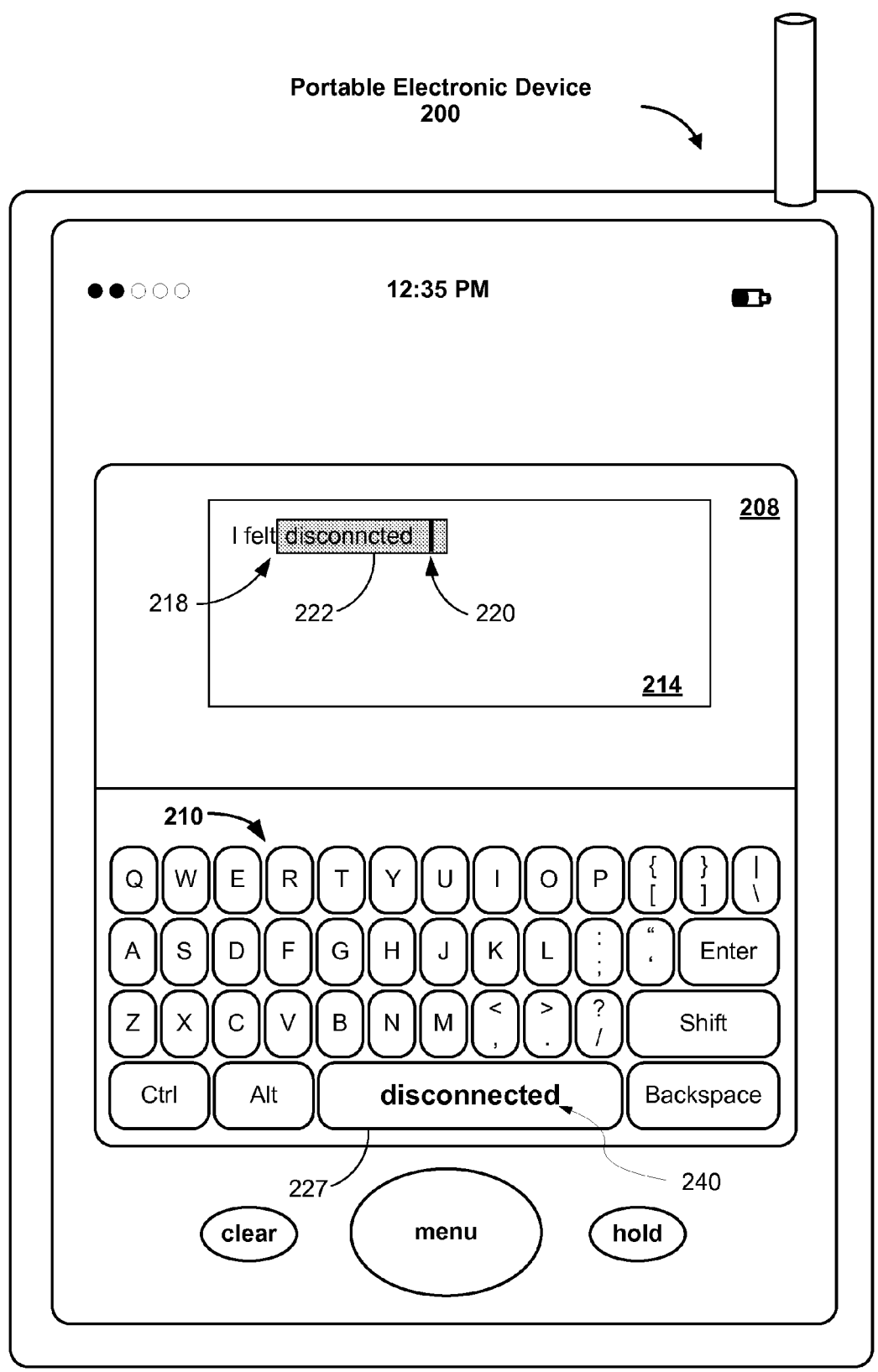

As shown in FIG. 4I, in some embodiments, the highest ranked suggested replacement 240 is displayed within the space bar 227. If the user performs a predefined gesture on or near the touch screen display (e.g., taps or touches the space bar 227), the current character string 222 is replaced by the replacement string 240 shown in the space bar 227, and the display of the space bar 227 is then returned to its normal or default status (e.g., blank, or with the word "space" displaced in the space bar (see FIG. 4H)). It is noted that the space bar 227 corresponds to a delimiter (i.e., a space). In some of these embodiments, only the highest ranked suggested replacement is presented to the user, and thus any other corrections must be made manually by the user. If the user performs a second gesture with respect to the touch screen display, such as tapping any key of the keyboard other than the space bar 227, the current character string 222 in retained.

The embodiments of the invention, as described above, provides an intuitive way to integrate explicit word selection (via suggested word replacements in the second area), implicit word selection (e.g., via the space bar or other delimiter keys), and explicit non-selection of suggested word replacements (via keeping the current word, e.g., for words with unusual spellings).

Figure 5A:
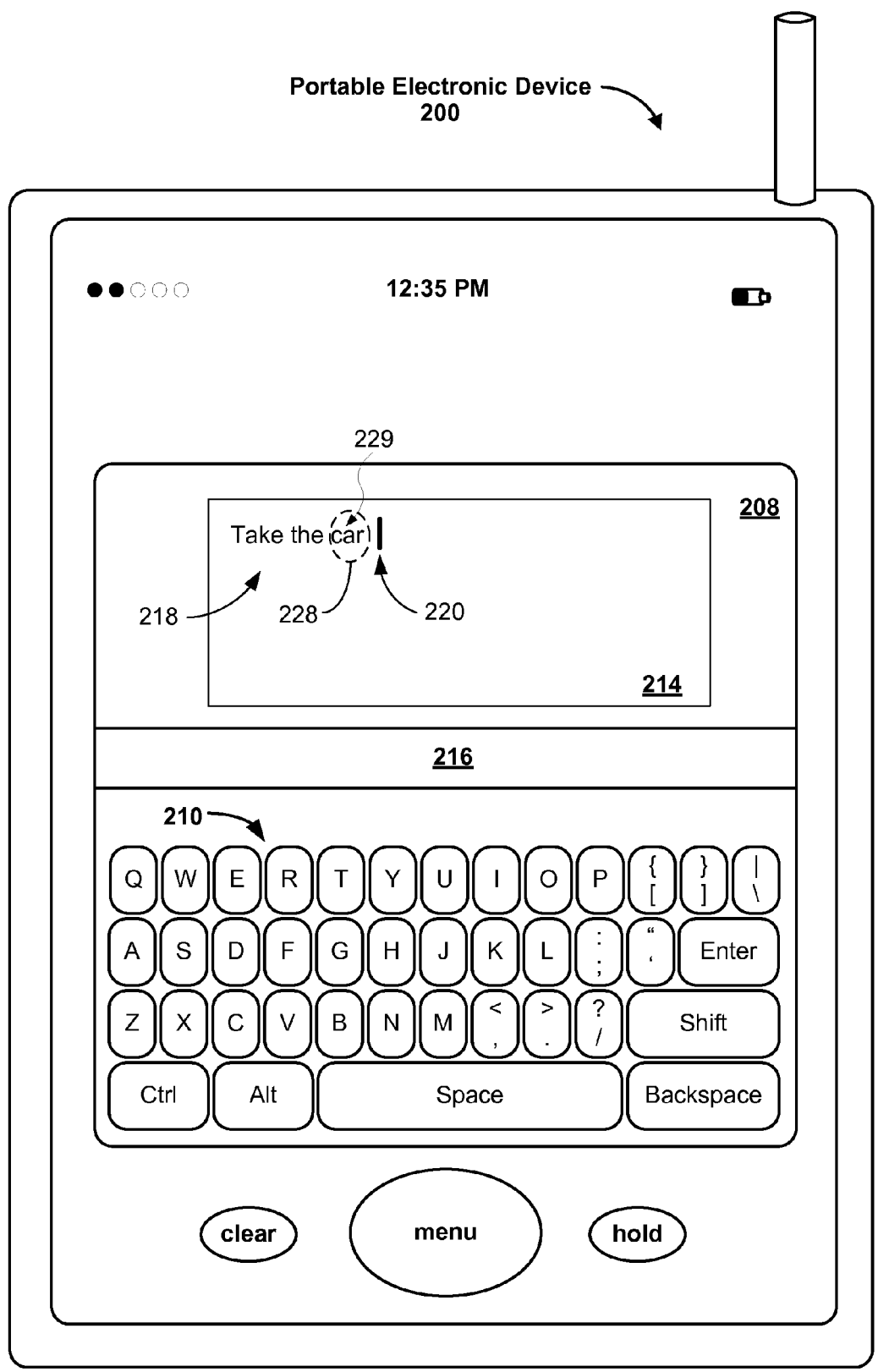
FIGS. 5A-5B illustrate a user interface for showing originally entered text in accordance with some embodiments.
Figure 5B:
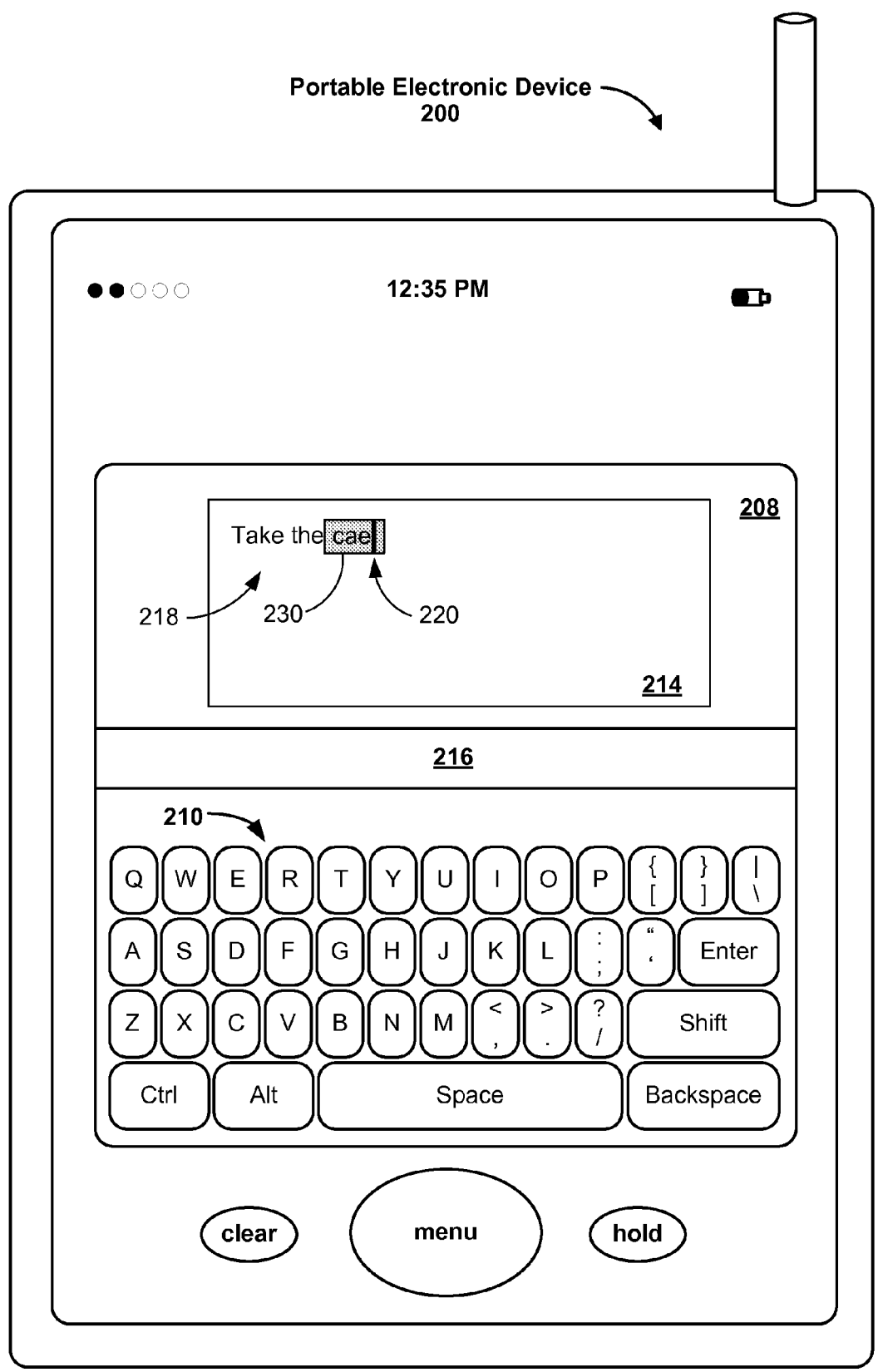

In some embodiments, the device 200 may allow the user to review strings replaced by user-selected suggested replacements. Attention is now directed to FIGS. 5A-5B, which illustrate a user interface for reviewing the originally entered strings that were replaced by suggested replacements. A user may perform a gesture over a word 229 in the entered text 218. For example, the user may tap the word 229 on the touch screen with a finger 212, as indicated by the contact area 228 in the display tray 214. If the word 229 (FIG. 5A) was a replacement for some originally entered text, the originally entered text 230 may be displayed (FIG. 5B). Alternately, the originally entered text may be displayed if the user's finger hovers over the word 229 for at least a threshold period of time (e.g., 0.5 seconds, 1.0 second, or a value between 0.35 and 1.25 seconds). In some embodiments, the originally entered text 230 is displayed in place of the word 229 for a predetermined amount of time, such as 2 seconds. After the time has elapsed, the word 229 is displayed back in its place unless an undo gesture (e.g., a tap on the original text) is performed, in which case the originally entered text 230 is durably restored. In some other embodiments, the originally entered text 230 is displayed in a balloon graphic or the like extending from the word 229.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a portable electronic device with a display and a keyboard:
      receiving a plurality of user inputs of characters through the keyboard, and displaying on the display a current character string as input by the user;
      displaying a suggested replacement character string for the current character string;
      while both the current character string and the suggested replacement string are displayed, receiving a further user input through a punctuation mark key of the keyboard; and
      in response to the further user input, replacing the current character string with the suggested replacement character string, and appending a punctuation mark at the end of the replacement character string, the punctuation mark corresponding to the punctuation mark key through which the further user input was received.

2. The method of claim 1, wherein the punctuation mark key corresponds to a punctuation mark selected from the group consisting essentially of a comma, a period, an exclamation point, a question mark, and a semicolon.

3. The method of claim 1, wherein the display is a touch screen display, and wherein the keyboard is a virtual keyboard displayed on the touch screen display.

4. The method of claim 3, wherein the virtual keyboard comprises a display that simultaneously displays a first plurality of virtual keys each associated with a respective letter of the alphabet, and a second plurality of virtual punctuation mark keys each corresponding to a respective punctuation mark.

5. The method of claim 4, wherein the plurality of virtual punctuation mark keys comprises a first virtual punctuation mark key corresponding to a comma and a second virtual punctuation mark key corresponding to a period.

6. The method of claim 1, wherein displaying a suggested replacement character string for the current character string comprises displaying a single suggested replacement character string.

7. A portable electronic device, comprising:
   one or more processors;
   a display;
   a keyboard; and
   computer readable memory comprising instructions that, when executed by the one or more processors, perform operations comprising:
      receiving a plurality of user inputs of characters through the keyboard, and displaying a current character string as input by the user,
      displaying a suggested replacement character string for the current character string;
      while both the current character string and the suggested replacement string are displayed, receiving a further user input through a punctuation mark key of the keyboard, and
      in response to the further user input, replacing the current character string with the suggested replacement character string, and appending a punctuation mark at the end of the replacement character string, the punctuation mark corresponding to the punctuation mark key through which the further user input was received.

8. The device of claim 7, wherein the punctuation mark key corresponds to a punctuation mark selected from the group consisting essentially of a comma, a period, an exclamation point, a question mark, and a semicolon.

9. The device of claim 7, wherein the keyboard is a virtual keyboard displayed on the touch screen display.

10. The device of claim 9, wherein the virtual keyboard comprises a display that simultaneously displays a first plurality of virtual keys each associated with a respective letter of the alphabet, and a second plurality of virtual punctuation mark keys each corresponding to a respective punctuation mark.

11. The device of claim 10, wherein the plurality of virtual punctuation mark keys comprises a first virtual punctuation mark key corresponding to a comma and a second virtual punctuation mark key corresponding to a period.

12. The device of claim 7, wherein displaying a suggested replacement character string for the current character string comprises displaying a single suggested replacement character string.

13. A method, comprising:
   at a portable electronic device with a display:
      receiving a plurality of user inputs of characters through the keyboard, and displaying on the display a current character string as input by the user,
      displaying on the display a suggested replacement character string for the current character string, and
      receiving a further user input of a single touch, wherein the portable electronic device is configured to receive the further single user input to perform a selected character string function of a plurality of possible character string functions depending on where the further single user input is received, the plurality of possible character string functions comprising,
      replacing the current character string with the suggested replacement character string in response to a single user input at a first location,
      replacing the current character string with the suggested replacement character string in combination with a first punctuation mark in response to a single user input at a second location, the second location being a first punctuation mark key on the keyboard corresponding to the first punctuation mark,
      replacing the current character string with the suggested replacement character string in combination with a second punctuation mark in response to a single user input at a third location, the third location being a second punctuation mark key on the keyboard corresponding to the second punctuation mark, and
accepting the current character string in response to a single user input at a fourth location.

14. The method of claim 13, wherein the display is a touch screen display, and wherein the keyboard is a virtual keyboard displayed on the touch screen display.

15. The method of claim 14, wherein the virtual keyboard comprises a display that simultaneously displays a first plurality of virtual keys each associated with a respective letter of the alphabet, and a second plurality of virtual punctuation mark keys each corresponding to a respective punctuation mark.

16. The method of claim 15, wherein the first punctuation mark key is a virtual punctuation mark key corresponding to the first punctuation mark, and the second punctuation mark key is a virtual punctuation mark key corresponding to the second punctuation mark.

17. A non-transitory computer readable storage medium storing one or more programs, the one or more programs comprising instructions, which when executed by a portable electronic device with a display, cause the portable electronic device to perform a method comprising:
receiving a plurality of user inputs of characters through the keyboard, and displaying on the display a current character string as input by the user,
displaying on the display a suggested replacement character string for the current character string, and
receiving a further user input of a single touch, wherein the portable electronic device is configured to receive the further single user input to perform a selected character string function of a plurality of possible character string functions depending on where the further single user input is received, the plurality of possible character string functions comprising,
replacing the current character string with the suggested replacement character string in response to a single user input at a first location,
replacing the current character string with the suggested replacement character string in combination with a first punctuation mark in response to a single user input at a second location, the second location being a first punctuation mark key on the keyboard corresponding to the first punctuation mark,
replacing the current character string with the suggested replacement character string in combination with a second punctuation mark in response to a single user input at a third location, the third location being a second punctuation mark key on the keyboard corresponding to the second punctuation mark, and
accepting the current character string in response to a single user input at a fourth location.

18. The non-transitory computer readable storage medium of claim 17, wherein the display is a touch screen display, and wherein the keyboard is a virtual keyboard displayed on the touch screen display.

19. The non-transitory computer readable storage medium of claim 18, wherein the virtual keyboard comprises a display that simultaneously displays a first plurality of virtual keys each associated with a respective letter of the alphabet, and a second plurality of virtual punctuation mark keys each corresponding to a respective punctuation mark.

20. The non-transitory computer readable storage medium of claim 19, wherein the first punctuation mark key is a virtual punctuation mark key corresponding to the first punctuation mark, and the second punctuation mark key is a virtual punctuation mark key corresponding to the second punctuation mark.

21. A method, comprising:
at portable electronic device with a touch screen display:
receiving a plurality of user inputs of characters through a virtual keyboard that simultaneously displays a first plurality of virtual keys each associated with a respective single letter of the alphabet, and a second plurality of virtual punctuation mark keys each corresponding to a respective punctuation mark,
displaying on the touch screen display a current character string as input by the user,
displaying on the display a suggested replacement character string for the current character string,
in response to a first user input at a first location, replacing the current character string with the suggested replacement character string,
in response to a second user input at a virtual punctuation mark key corresponding to a first punctuation mark, replacing the current character string with the suggested replacement character string in combination with the first punctuation mark, and
in response to a third user input at a third location, accepting the current character string.

22. A non-transitory computer readable storage medium storing one or more programs, the one or more programs comprising instructions, which when executed by a portable electronic device with a touch screen display, cause the portable electronic device to perform a method comprising:
receiving a plurality of user inputs of characters through a virtual keyboard that simultaneously displays a first plurality of virtual keys each associated with a respective single letter of the alphabet, and a second plurality of virtual punctuation mark keys each corresponding to a respective punctuation mark,
displaying on the touch screen display a current character string as input by the user,
displaying on the display a suggested replacement character string for the current character string,
in response to a first user input at a first location, replacing the current character string with the suggested replacement character string,
in response to a second user input at a virtual punctuation mark key corresponding to a first punctuation mark, replacing the current character string with the suggested replacement character string in combination with the first punctuation mark, and
in response to a third user input at a third location, accepting the current character string.

23. A method comprising:
at a portable electronic device with a touch screen display:
receiving a plurality of user character inputs through the touch screen display of the portable electronic device, wherein the user character inputs are received through a virtual keyboard displayed on the touch screen, wherein the virtual keyboard simultaneously displays a first plurality of virtual keys each associated with a respective single letter of the alphabet, and a second plurality of virtual punctuation mark keys;
displaying on the touch display a current character string as input by a user;
while displaying the current character string, also displaying a suggested replacement character string for the current character string, wherein at the time a suggested replacement character string is displayed, the portable electronic device is able to receive a plurality of possible user single touch inputs that will result in selection of the suggested replacement character string, and wherein said plurality of possible user single touch inputs includes actuation of one of the plurality of virtual punctuation mark keys;

receiving a single touch user selection input through one of the plurality of the virtual punctuation mark keys; and in response to the single touch user selection input, replacing the current character set with the suggested replacement character set and adding at the end of said character set a punctuation mark corresponding to the virtual punctuation mark key through which the input was received.

24. The method of claim 23, wherein the plurality of possible single touch user inputs that will result in selection of the suggested replacement character string includes inputs that are not associated with a virtual punctuation mark key.

25. The method of claim 24, wherein the plurality of possible single touch user inputs that are not associated with a virtual punctuation mark key and that will result in selection of the suggested replacement character string comprises a single touch input through the space bar of the virtual keyboard.

26. The method of claim 24, wherein the plurality of possible single touch user inputs that are not associated with a virtual punctuation mark key and that will result in selection of the suggested replacement character string comprises a single touch input at the location of the displayed suggested replacement character set.

27. The method of claim 23, wherein the plurality of virtual punctuation mark keys comprises virtual punctuation mark keys respectively associated with a comma and a period.

28. The method of claim 27, wherein the plurality of virtual punctuation mark keys further comprises virtual punctuation mark keys respectively associated with an exclamation point and a semicolon.

29. A portable electronic device, comprising:
one or more processors;
a touch screen display; and
computer readable memory comprising instructions that, when executed by the one or more processors, perform operations comprising:
receiving a plurality of user character inputs through the touch screen display of the portable electronic device, wherein the user character inputs are received through a virtual keyboard displayed on the touch screen, wherein the virtual keyboard simultaneously displays a first plurality of virtual keys each associated with a respective single letter of the alphabet, and a second plurality of virtual punctuation mark keys;

displaying on the touch display a current character string as input by a user;

while displaying the current character string, also displaying a suggested replacement character string for the current character string, wherein at the time a suggested replacement character string is displayed, the portable electronic device is able to receive a plurality of possible user single touch inputs that will result in selection of the suggested replacement character string, and wherein said plurality of possible user single touch inputs includes actuation of one of the plurality of virtual punctuation mark keys;

receiving a single touch user selection input through one of the plurality of the virtual punctuation mark keys; and in response to the single touch user selection input, replacing the current character set with the suggested replacement character set and adding at the end of said character set a punctuation mark corresponding to the virtual punctuation mark key through which the input was received.

30. The device of claim 29, wherein the plurality of possible single touch user inputs that will result in selection of the suggested replacement character string includes inputs that are not associated with a virtual punctuation mark key.

31. The device of claim 30, wherein the plurality of possible single touch user inputs that are not associated with a virtual punctuation mark key and that will result in selection of the suggested replacement character string comprises a single touch input through the space bar of the virtual keyboard.

32. The device of claim 30, wherein the plurality of possible single touch user inputs that are not associated with a virtual punctuation mark key and that will result in selection of the suggested replacement character string comprises a single touch input at the location of the displayed suggested replacement character set.

33. The device of claim 29, wherein the plurality of virtual punctuation mark keys comprises virtual punctuation mark keys respectively associated with a comma and a period.

34. The device of claim 33, wherein the plurality of virtual punctuation mark keys further comprises virtual punctuation mark keys respectively associated with an exclamation point and a semicolon.

* * * * *